(12) United States Patent
Gehring

(10) Patent No.: US 9,824,719 B2
(45) Date of Patent: Nov. 21, 2017

(54) AUTOMATIC MUSIC RECORDING AND AUTHORING TOOL

(71) Applicant: APPLE INC., Cupertino, CA (US)

(72) Inventor: Steffen Gehring, Hamburg (DE)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 14/871,978

(22) Filed: Sep. 30, 2015

(65) Prior Publication Data
US 2017/0092320 A1    Mar. 30, 2017

(51) Int. Cl.
| | |
|---|---|
| *H04R 29/00* | (2006.01) |
| *G11B 20/10* | (2006.01) |
| *G10H 1/00* | (2006.01) |
| *H04H 60/05* | (2008.01) |
| *G11B 27/28* | (2006.01) |
| *G11B 27/34* | (2006.01) |

(52) U.S. Cl.
CPC ..... *G11B 20/10527* (2013.01); *G10H 1/0033* (2013.01); *G11B 27/28* (2013.01); *G11B 27/34* (2013.01); *H04H 60/05* (2013.01); *G10H 2210/046* (2013.01); *G10H 2210/051* (2013.01); *G11B 2020/10574* (2013.01)

(58) Field of Classification Search
CPC .............. H04R 2225/43; H04R 25/353; H04R 29/001; H04R 29/008; H04R 2430/01; H04R 2499/11; H04R 29/00; H04R 29/002; H04R 3/005
USPC ......................................................... 381/56
See application file for complete search history.

(56) References Cited

U.S. PATENT DOCUMENTS

| | | |
|---|---|---|
| 5,424,486 A | 6/1995 | Aoki |
| 5,877,445 A | 3/1999 | Hufford |
| 6,225,546 B1 | 5/2001 | Kraft |

(Continued)

FOREIGN PATENT DOCUMENTS

| | | |
|---|---|---|
| EP | 1923863 A1 | 5/2008 |
| EP | 1994525 A2 | 11/2008 |
| EP | 2043006 A1 | 4/2009 |
| EP | 2495720 A1 | 9/2012 |
| JP | 2011150060 A | 8/2011 |

OTHER PUBLICATIONS

Shazam Entertainment Ltd., "Shazam—Discover music, artists, videos & lyrics," available at https://itunes.apple.com/us/app/shazam-discover-music-artists/id284993459?mt=8, retrieved Oct. 28, 2015, 4 pages.

(Continued)

*Primary Examiner* — Akelaw Teshale
(74) *Attorney, Agent, or Firm* — Kilpatrick Townsend & Stockton LLP

(57) ABSTRACT

A method for automatically starting an audio recording that includes receiving audio data and dividing the audio data into a first set of consecutive segments and a second set of consecutive segments that occur after the first set. The method further includes analyzing the first set of segments by measuring an average energy and peak value for each segment of the first set and determining a silence score therefrom, and analyzing the second set of segments by measuring an average energy and peak value for each segment of the second set and determining an music score therefrom. The method begins a recording of the audio data if the silence score is above a first predetermined value and the music score is above a second predetermined value.

20 Claims, 17 Drawing Sheets

(56) References Cited

U.S. PATENT DOCUMENTS

| | | |
|---|---|---|
| 7,732,697 B1 | 6/2010 | Wieder |
| 8,044,290 B2 | 10/2011 | Kwon |
| 8,283,548 B2 | 10/2012 | Oertl |
| 9,117,432 B2 | 8/2015 | Nakamura |
| 2002/0176343 A1 | 11/2002 | Yamada et al. |
| 2004/0025672 A1 | 2/2004 | Carpenter |
| 2005/0096764 A1* | 5/2005 | Weiser ............... G11B 27/034 700/94 |
| 2007/0255739 A1 | 11/2007 | Miyajima et al. |
| 2007/0289434 A1 | 12/2007 | Yamada |
| 2008/0077263 A1* | 3/2008 | Yamane ............... G11B 27/031 700/94 |
| 2008/0209484 A1 | 8/2008 | Xu |
| 2011/0112672 A1 | 5/2011 | Brown |
| 2011/0208330 A1 | 8/2011 | Oomae et al. |
| 2011/0235811 A1 | 9/2011 | Koga et al. |
| 2012/0014673 A1 | 1/2012 | O'Dwyer |
| 2012/0051550 A1* | 3/2012 | Koga ............... G10L 25/87 381/56 |
| 2012/0312145 A1 | 12/2012 | Kellett |
| 2013/0275421 A1 | 10/2013 | Resch |
| 2014/0260909 A1 | 9/2014 | Matusiak |
| 2014/0330556 A1 | 11/2014 | Resch |
| 2014/0338515 A1 | 11/2014 | Sheffer |
| 2014/0352521 A1 | 12/2014 | Takahashi et al. |
| 2016/0148604 A1 | 5/2016 | Minamitaka |

OTHER PUBLICATIONS

Notice of Allowance dated Jan. 30, 2017 in U.S. Appl. No. 14/871,271, 7 pages.
Office Action dated Feb. 24, 2017 in U.S. Appl. No. 14/871,897, 14 pages.
Notice of Allowance dated May 11, 2017 in U.S. Appl. No. 14/871,902, 8 pages.
Office Action dated Aug. 25, 2016 in U.S. Appl. No. 14/871,271, 6 pages.
Office Action dated Aug. 26, 2016 in U.S. Appl. No. 14/871,902, 6 pages.
International Search Report and Written Opinion dated Nov. 22, 2016 in PCT/US2016/046118, 10 pages.
Panagiotakis, C. et al., "A Speech/Music Discriminator Based on RMS and Zero-Crossings," IEEE Transactions on Multimedia, Feb. 1, 2005, vol. 7, No. 1, pp. 155-166.
International Search Report and Written Opinion dated Nov. 28, 2016 in PCT/US2016/046117, 13 pages.
Lazier, et al., "Mosievius: Feature Driven Interactive Audio Mosaicing," Proceedings of the 6$^{th}$ International Conference on Digital Audio Effects, Sep. 8-11, 2003, London, UK, 6 pages.
International Search Report and Written Opinion dated Dec. 13, 2016 in PCT/US2016/047866, 14 pages.

* cited by examiner

AUTOMATIC MUSIC RECORDING AND AUTHORING TOOL

CROSS-REFERENCES TO RELATED APPLICATIONS

The following regular U.S. patent applications (including this one) are being filed concurrently, and the entire disclosure of the other applications are incorporated by reference into this application for all purposes:

application Ser. No. 14/871,982, filed Sep. 30, 2015, entitled "AUTOMATIC MUSIC RECORDING AND AUTHORING TOOL";
application Ser. No. 14/871,271, filed Sep. 30, 2015, entitled "AUTOMATIC COMPOSER";
application Ser. No. 14/871,902, filed Sep. 30, 2015, entitled "MUSIC ANALYSIS PLATFORM; and
application Ser. No. 14/871,897, filed Sep. 30, 2015, entitled "MUSIC ANALYSIS PLATFORM".

BACKGROUND

Over the last several decades, audio recording capabilities have become more and more accessible to average users. Where musicians conventionally had to travel to recording studios to record their ideas, improvements in technology have brought cheaper and more sophisticated mobile recording devices to the masses, allowing musicians to record their ideas virtually anywhere and at a moment's notice. Some contemporary recording devices are hand-held (e.g., mobile phones, voice memo recorders, etc.) for portability and convenience.

However, despite these improvements, there are several shortcomings with contemporary recording devices that stifle creativity. For instance, starting a recording session typically requires a user to navigate a number of menus and settings to place the device in the correct mode of operation and manually press a button to initiate a recording session. This can be cumbersome and repeated takes (track recordings) can interfere with the creative process, particular with off-the-cuff "scratch" recordings that may be used to capture inspired but fleeting musical ideas. Furthermore, these recordings may include unwanted sounds (e.g., talking, background noise, etc.) before and after the performance, which may need to be removed post-performance with editing software. Improved recording devices and processes are needed.

BRIEF SUMMARY

Certain embodiments of the invention include a user-interface (UI) on a mobile display device (e.g., mobile phone) that allows a user to automatically start a musical recording by simply playing an instrument (e.g., guitar, piano, horn, drum kit, etc.) without requiring manual interaction. For example, recording software can be configured to "listen" for an audio input (via microphone or direct line-in) and determine when a musical performance is being played versus unwanted background noise (e.g., talking, non-musical sounds, white noise, etc.). The resultant recording is accurate and begins when the music begins, which can eliminate the need to edit unwanted noises and artifacts at a later time. In certain implementations, this process can automatically stop a musical recording upon detecting that the musical performance has stopped, such that the recording ends when the musical performance ends. This can eliminate the need to remove unwanted post-performance audio artifacts. Further embodiments may detect and utilize harmonic content within the audio input (e.g., detect notes, chords, time signatures, etc.) to further improve accuracy in detecting actual musical performances and automatically starting and/or stopping the recording at the appropriate time.

In certain embodiments, a computer-implemented method includes receiving audio data by a processor, dividing the audio data into a first set of consecutive segments and a second set of consecutive segments, where the second set of segments occur after the first plurality of segments. The method further includes analyzing, by the processor, the first set of segments by measuring an average energy for the one or more of the first set of segments and determining a silence score based on the average energies for the one or more of the first set of segments. The method continues with analyzing, by the processor, the second set of segments by measuring an average energy for the one or more of the second set of segments, and determining an music score based on the average energy for the one or more of the second set of segments. In some implementations, the method includes beginning a recording of the audio data if the silence score is above a first predetermined value, and the music score is above a second predetermined value. The predetermined values can be thresholds used to determine when silence and/or audio is detected.

In further embodiments, analyzing the first set of segments and/or the second set of segments can further include measuring a maximum amplitude for or more of the corresponding set of segments (first or second). Determining the silence score can further be based on the maximum amplitudes for the one or more of the first set of segments. Determining the music score can further be based on the maximum amplitudes for the one or more of the second set of segments. In some cases, analyzing the first set of segments further includes comparing the average energy for the one or more of the first set of segments to a first threshold value, and increasing the silence score in response to consecutive segments of the first set of segments being higher than the first threshold value. Analyzing the second set of segments can further include comparing the average energy for the one or more of the second set of segments to a second threshold value, and increasing the music score in response to consecutive segments of the second set of segments being higher than the second threshold value. The music score can be further based, in part, on a relative difference between average energy of the one or more of the second set of segments as compared to average energy of the one or more of the first set of segments.

In some embodiments, the method further includes receiving additional audio data by the processor, the additional audio data being a continuation of the audio data and received after the audio data, and dividing, by the processor, the additional audio data into a third set of consecutive segments. The method may proceed by analyzing, by the processor, the third set of segments by measuring an average energy for the one or more of the third plurality of segments, determining a silence score based on the maximum and average energy for the one or more of the third set of segments, and stopping the recording of the audio if the silence score is above the first predetermined value. In an exemplary embodiment, the first set of segments includes 5 segments, the second set of segments includes 5 segments, and each segment in the first and second set of segments is 0.5 seconds in length.

In further embodiments, analyzing the first set of segments further includes receiving a harmonic analysis for the one or more of the first set of segments, where the harmonic analysis corresponds to identified harmonic content within the one or more of the first set of segments. Analyzing the second set of segments can further include receiving a harmonic analysis for the one or more of the second set of segments, where the harmonic analysis corresponds to identified harmonic content within the one or more of the second set of segments. Determining the silence score can be further based on a harmonic analysis for the one or more of the first set of segments, and determining an music score can be further based on the harmonic analysis for the one or more of the second set of segments. Further yet, the method can include storing the audio recording in an output file, where the audio recording starts at the beginning of the first set of consecutive segments.

DETAILED DESCRIPTION

Embodiments of the invention relate generally to digital audio recording and more specifically to automatically starting and/or stopping an audio recording in response to detecting a beginning and ending of a musical performance.

Embodiments of the invention include a user-interface (UI) on a mobile display device (e.g., mobile phone) that allows a user to automatically start a musical recording by simply playing an instrument (e.g., guitar, piano, horn, drum kit, etc.) without requiring manual interaction. For example, recording software can be configured to "listen" for an audio input (via microphone or direct line-in) and determine when a musical performance is being played versus unwanted background noise (e.g., talking, non-musical sounds, white noise, etc.). The resultant recording is accurate and begins when the music begins, which can eliminate the need to edit unwanted noises and artifacts at a later time. In certain implementations, this process can automatically stop a musical recording upon detecting that the musical performance has stopped, such that the recording ends when the musical performance ends. This can eliminate the need to remove unwanted post-performance audio artifacts. Further embodiments may detect and utilize harmonic content within the audio input (e.g., detect notes, chords, time signatures, etc.) to further improve accuracy in detecting actual musical performances and automatically starting and/or stopping the recording at the appropriate time.

Figures 1A, 1B:
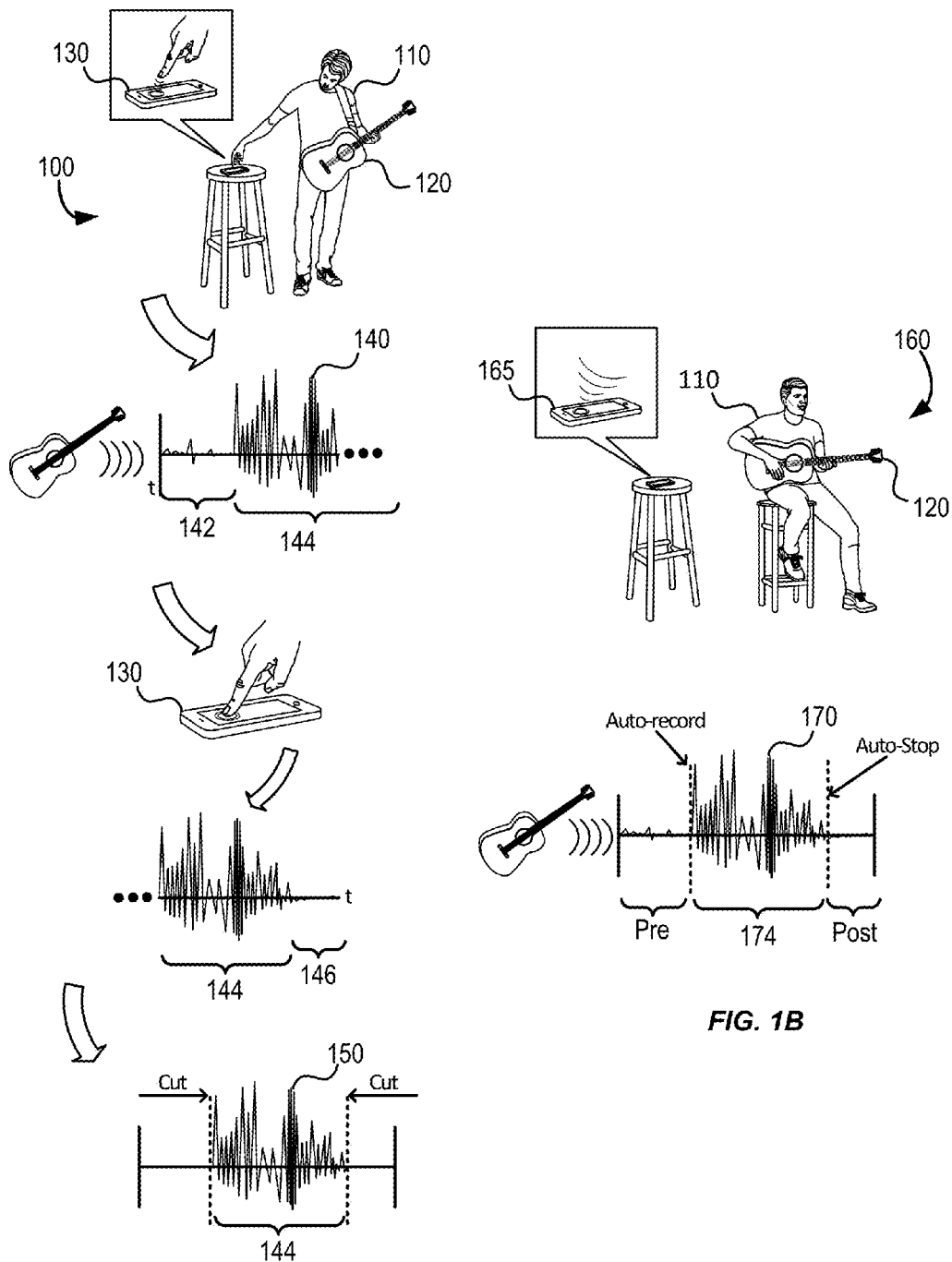
FIG. 1A shows a typical recording process for a conventional mobile recording device.
FIG. 1B shows a recording process, according to certain embodiments of the invention.

FIG. 1A shows a typical recording process 100 for a conventional mobile recording device. A musician 110 is shown with guitar 120 in hand pressing a record button on a mobile recording device 130 ("mobile device 130") to initiate a recording. Any suitable recording device can be used (mobile phone, digital audio recording station, laptop, tablet computer, desktop computer, wearable computing device, etc.). Any suitable instrument can be used any may be recorded via microphone or direct input.

Wave form 140 shows a resulting musical recording showing amplitude versus time and includes a pre-performance section 142, a musical performance section 144, and a post-performance section 146. Pre-performance section 142 includes a number of spurious non-musical transients that occur after musician 110 presses the record button and before he actually plays instrument 120. The non-musical transients can include any non-musical signal including background white noise, talking, movement (e.g., chairs sliding, movement, etc.), and the like. Musical performance 144 includes a period of time that musician 110 is playing guitar 120 and is shown as an analog waveform, although other analog or digital representations are possible. Post-performance section 146 includes a number of spurious non-musical transients that occur after musician 110 presses the stop button to end the recording after he played instrument 120. The non-musical transients can include any non-musical signal including background white noise, talking, movement (e.g., chairs sliding, movement), etc. Waveform 150 depicts waveform 140 as seen in a typical digital audio workstation (DAW). Musical performance section 144 is trimmed to its start and ending boundaries by an audio cutting tool to remove pre and post-performance sections 142, 146, leaving only musical performance 144.

Thus, musician 110 is required to stop playing to start and stop a recording. This can be cumbersome and repeated takes can interfere with the creative process, particular with off-the-cuff "scratch" recordings that may be used to capture inspired but fleeting musical ideas. This conventional method of recording has been supplanted by new and improved methods of easy and efficient recording processes, according to certain embodiments of the invention.

FIG. 1B shows a recording process 160, according to certain embodiments of the invention. A musician 110 is shown with guitar 120 in hand. A mobile recording device 165 ("mobile device 165") is used to initiate a recording. Any suitable recording device can be used (mobile phone, digital audio recording station, laptop, tablet computer, desktop computer, wearable computing device, etc.). Any suitable instrument can be used any may be recorded via microphone or direct input.

Musician 110 can set mobile device 165 to automatically begin recording in several different ways. For instance, musician 110 can simply start playing guitar 120, which will cause mobile device 165 to begin recording. Alternatively, musician 110 can begin a count (e.g., "1 . . . 2 . . . 3 . . . 4 . . . "), which can be recognized by mobile 165 as a precursor to beginning the recording. In each case, mobile device 165 automatically begins recording and only captures the musical performance in its entirety, as further discussed below. Wave form 170 shows a resulting musical recording (amplitude versus time) that only includes a musical performance section 174 with none of the non-musical transients that may have occurred before and afterwards being captured in the recording. Waveforms 140, 150, 170 are shown as would typically be depicted in a digital audio workstation (DAW).

Thus, musician 110 is not required to stop playing to start and stop a recording. This allows musician 110 (or multiple musicians) the creative freedom to simply play their instrument with the assurance that their musical performances will all be automatically captured in real-time without any human interaction required. This novel and improved recording function is further described in the embodiments below.

System Architecture

The following system architectures show aspects of the present invention in the context of a larger suite of audio recording and processing tools that may be included together in certain embodiments of the invention. An automatic start/stop engine (algorithm) is discussed in FIGS. 2 and 5 and embodiments utilizing this technology, including an accompanying UI, are discussed at least with respect to FIGS. 5-17.

Figure 2:
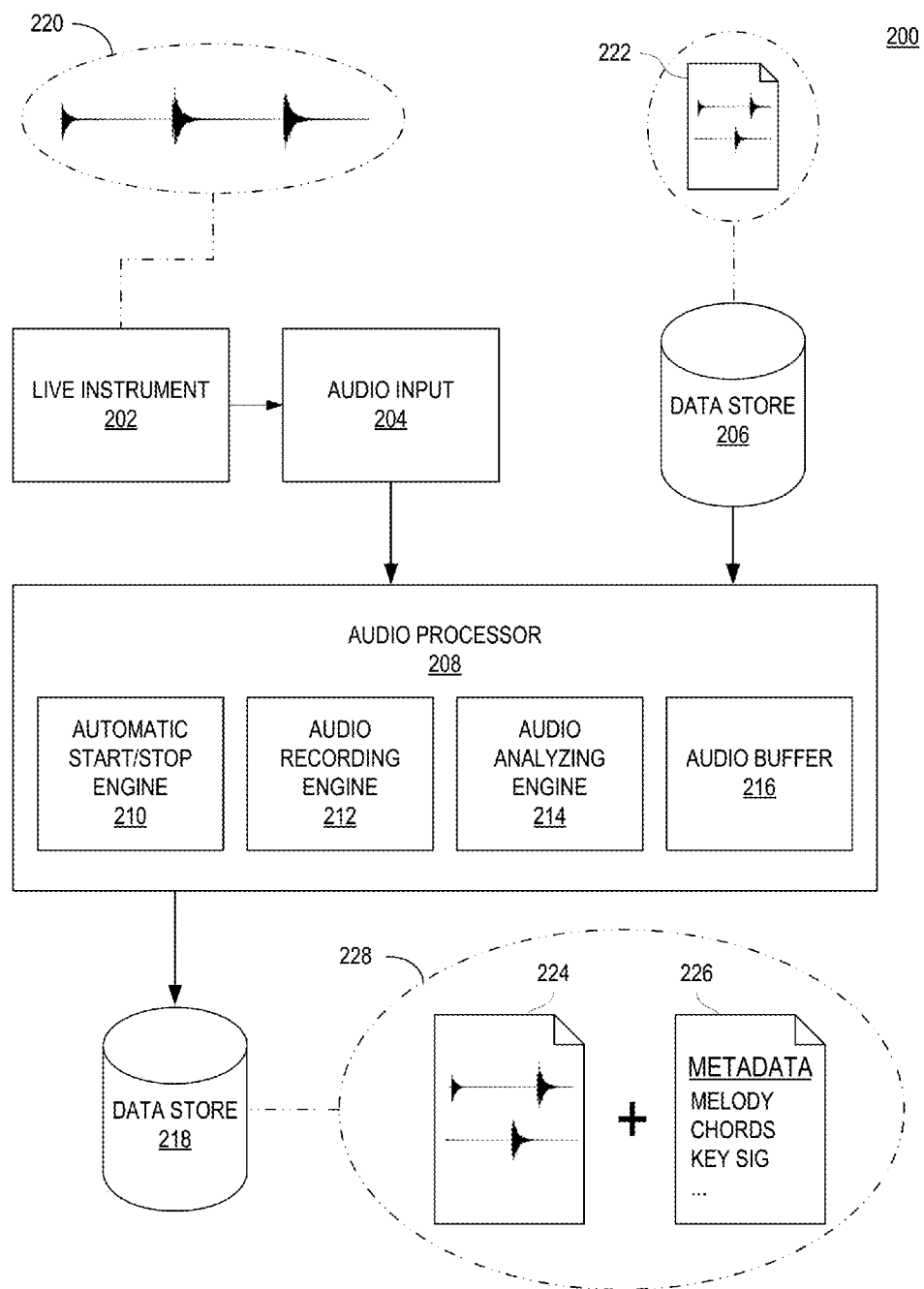
FIG. 2 is a schematic diagram depicting an audio processing system, according to certain embodiments of the invention.

FIG. 2 is a schematic diagram depicting an audio processing system 200, according to certain embodiments of the invention. The audio processing system 200 can be embodied in one or more pieces of hardware, such as a single device (e.g., smartphone or computer), multiple devices directly coupled together (e.g., a rack of equipment), multiple devices remotely coupled together (e.g., multiple computers communicatively coupled together via a network), or any combination thereof. The audio processing system 200 can include an audio processor 208 capable of accessing audio data. Audio data can include any data received by the audio processor 208 that is representative of a sound. Audio data can be provided as an audio signal 220 or an audio file 222.

An audio signal 220 can be any analog or digital signal being performed or created in real-time. In some cases, audio signals 220 can be created by a live instrument 202 and provided to the audio processor 208 through an audio input 204. In some cases, audio signals 220 can be sound waves originating from a live instrument 202 (e.g., an acoustic guitar, a piano, a violin, a flute, or other traditional or non-traditional instrument capable of producing sound waves) that are picked up by an audio input 204 that is a microphone (e.g., a dynamic microphone, condenser microphone, ribbon microphone, fiber optic microphone, condenser microphone, hydrophone, or any other device capable of generating an electrical signal representative of a sound wave). In some cases, audio signals 220 can originate from voice (e.g., a singer or chorus), speakers (e.g., a pre-recorded sound or a live-played sound), nature-based sounds (e.g., wind noises or water noises), or other sources besides traditional instruments which can be received by an audio input 204 that is a microphone.

In some cases, audio signals 220 can be analog electrical signals originating from a live instrument 202 (e.g., electric guitar, electric piano, electric violin, Theremin, or other traditional or non-traditional instrument capable of producing an electrical signal corresponding to a sound wave) and received by an audio input 204 that is a line input.

In some cases, audio signals 220 can be digital signals originating from a live instrument 202 (e.g., a Musical Instrument Digital Interface (MIDI) controller, a computer-based digital instrument, or other traditional or non-traditional instrument capable of producing a digital signal representative of a sound wave) and received by an audio input 204 that is a digital signal processor. In some cases, audio signals 220 that are digital signals can be provided directly to the audio processor 208.

In some cases, other equipment, such as preamplifiers, digital signal processors, compressors, analog-to-digital converters, and the like, can be included as part of the audio input 204 or coupled between the audio input 204 and the audio processor 208.

In addition to or instead of receiving an audio signal 220, the audio processor 208 can receive audio data in the form or an audio file 222. Audio file 222 can be any audio data stored in a file that is representative of an audio signal 220, such as a waveform audio file, Moving Picture Experts Group (MPEG)-1 or MPEG 2 Audio Layer III (MP3) file, Apple Lossless Audio Codec (ALAC), or any other file containing audio data. In some cases, an audio file 222 can be included in a file containing more than just audio data, such as a video file or other file. The audio file 222 can be stored on a data store 206. Data store 206 can be any storage medium accessible to the audio processor 208, such as built-in memory (e.g., flash storage in a smartphone), external memory (e.g., an external hard drive of a computer), or remotely accessible memory (e.g., a hard drive of a computer accessible to the audio processor 208 via a network, such as the internet). In some cases, an audio file 222 can be generated in real-time (e.g., by a computer-based instrument) and need not be previously stored in a data store prior to being provided to the audio processor 208.

In some cases, the audio file 222 is a streaming file that is provided to the audio processor 208 through a communication link, such as a wireless or wired network connection. The streaming file can originate from a remote source, such as a recording device placed a distance from the audio processor 208 or a server accessible through a network (e.g., the Internet). In an example, a smartphone can act as a recording device and can be coupled to a computer via a communication link (e.g., WiFi or Bluetooth connection), where the computer acts as the audio processor 208. In that example, the smartphone can receive audio signals 220 at a microphone and store the audio signals as an audio file 222 which can be transmitted to the computer for further processing.

The audio processor 208 can process any incoming audio data. The audio processor 208 can include one or more of an automatic start/stop engine 210, an audio recording engine 212, an audio analyzing engine 214, and an audio buffer 216. The audio processor 208 can include more or fewer components. The audio processor 208 can be embodied in one or more data processors, such as central processing units (CPUs), application-specific integrated circuits (ASICs), microprocessors, or other devices or components capable of performing the functions associated with the audio processor 208.

The audio buffer 216 can include memory capable of storing incoming audio data. The audio buffer 216 can be stored on volatile or non-volatile memory. The audio buffer 216 can store a predetermined amount of audio data, such as a predetermined size (e.g., in bytes) or a predetermined length (e.g., in seconds) of audio data. In some cases, the audio buffer 216 can store the last n seconds of incoming audio data. The audio buffer 216 can overwrite itself in real-time so that the last n seconds or last n bytes of audio data are always available. In an example, the audio buffer 216 can store approximately five seconds worth of audio data, although shorter or longer audio buffers 216 can be used. In some cases, the size or length of the audio buffer 216 can be manually set, such as by a setting of a program or application utilizing the audio buffer 216. In some cases, the size or length of the audio buffer 216 can be automatically set, such as automatically increasing the size of the audio buffer 216 if a determination is made that current size of the audio buffer 216 is insufficient for its current purposes, or automatically decreasing the size of the audio buffer 216 if a determination is made that the current size of the audio buffer 216 exceeds is current purposes. In some cases, the size of the audio buffer 216 can be automatically scaled based on certain settings or parameters, such as a recording mode (e.g., more or less sensitive), input choice (e.g., line input versus microphone input), environmental parameters (e.g., noisy environment versus a quiet environment or steady noise environment versus an environment with occasional disruptive noises).

The automatic start/stop engine 210 can include one or more of an automatic start detector and an automatic stop detector. The automatic start/stop engine 210 can process incoming audio data (e.g., from an audio input 204, from a data store 206, or from the audio buffer 216). In some cases, the automatic start/stop engine 210 can dynamically analyze the contents of the audio buffer 216 to determine if a start event has occurred. In some cases, the automatic start/stop engine 210 can dynamically analyze and compare the first half of the audio buffer 216 with the second half of the audio buffer 216 to determine if a start event has occurred in the middle of the audio buffer 216.

The automatic start/stop engine 210 can look for characteristics (e.g., mathematical, calculated, musical, or other characteristics) of the audio data that are indicative of a start event. The start event can correspond to a time at which a desired action is to take place. For example, upon detecting a start event, the automatic start/stop engine 210 can initiate recording of the incoming audio data, such as by copying some or all of the audio buffer 216 (e.g., that portion of the audio buffer 216 that occurs at or after the start event) into a data file 224 of a data store 218 and begin appending the data file 224 with real-time audio data using the audio recording engine 212. Upon detecting a start event, the automatic start/stop engine 210 can also initiate analysis of the incoming audio data using the audio analyzing engine. The automatic start/stop engine 210 can trigger other tasks upon detection of a start event.

In some cases, the automatic start/stop engine 210 can look for a pre-determined start event, such as the presence of musical content in the audio data. In some cases, the automatic start/stop engine 210 can look for other start events, such as detection of a count-off (e.g., speech recognition of "one, two, three, four") or detection of a particular characteristics such as a note, chord, or sequence of notes or chords (e.g., if a user wishes to record a second take of an existing recording, the automatic start/stop engine 210 can detect when the incoming audio data has characteristics similar to the beginning characteristics of the existing recording). In some cases, the automatic start/stop engine 210 can be used to trigger an action upon detection of musical content, versus noise or non-musical speech.

The automatic start/stop engine 210 can also analyze incoming audio data to determine a stop event (e.g., similarly to how a start event is determined). The stop event can be similar to and opposite from the start event, or can be otherwise defined. Upon detection of the stop event, the automatic start/stop engine 210 can trigger an action to stop (e.g., recording of incoming audio data) or trigger another action to be performed (e.g., transmitting the audio file 224 or beginning of post-processing the audio file 224). In an example use case, an automatic start/stop engine 210 can be used to automatically remove non-musical content from a radio station being recorded; the automatic start/stop engine 210 can automatically start recording (e.g., to create a new audio file 224 or append an existing audio file 224) upon detection of musical content and can automatically stop or pause recording upon detection of non-musical content.

The audio recording engine 212 can store incoming audio data as an audio file 224 stored on a data store 218. The data store 218 can be the same data store as data store 206, or can be a different data store 218. Data store 218 can be any suitable storage medium accessible to the audio processor 208, such as internal memory, external memory, or remote memory. In some cases, audio recording engine 212 can access audio buffer 216 to prepend any incoming audio data with some or all of the audio data stored in the audio buffer 216. In some cases, the audio recording engine 212 can append an existing audio file 224, such as if an audio file 224 was created using some or all of the audio data stored in the audio buffer 216.

The audio analyzing engine 214 can process incoming audio data (e.g., from live audio signals 220 or existing audio files 222) to generate metadata 226 related to the audio data. The metadata 226 can correspond to musical properties of the audio data, such a melody transcription, a chord transcription, one or more key signatures, or other such musical properties of the audio data. The metadata 226 can be stored as an independent file on the data store 218 and be related to the audio file 224. In some cases, the metadata 226 and the audio file 224 can be stored as parts in the same data file. In some cases, metadata 226 can be encoded directly into the audio file 224 (e.g., as signals that are demodulatable from the audio signal in the audio file 224).

The audio analyzing engine 214 can perform one or more of real-time (e.g., approximately real-time or dynamic) and non-real-time (e.g., post-processing of an entire audio file 224) analysis of audio data. In some cases, the audio analyzing engine 214 can perform an initial real-time analysis of incoming audio data (e.g., as being played from a live instrument 202) to determine some musical properties or estimates of musical properties, and then perform an additional non-real-time analysis of the audio file 224 to determine some musical properties or validate estimated musical properties.

In some cases, an audio analyzing engine of another device (e.g., a remove server) can perform additional processing to determine or validate one or more musical properties of the audio data (e.g., of audio file 224). In some cases, the audio processor 208 can transmit the audio file 224, the metadata 226, or both to the other device for further processing. Upon processing the received data, the other device can transmit new or updated data to the audio processor 208 (e.g., a new audio file 224, new metadata 226, or both).

In some cases, the audio processor 208 can be coupled to an output device, such as a display 230 or an audio output 232, although other output devices can be used. The audio processor 208 can produce outputs through the output device(s) related to any processes occurring in the audio processor 208, such as an audio analyzing process. In an example, the audio analyzing engine 214 can output musical properties to a display 230 (e.g., computer monitor or smartphone screen) in real-time while the audio data is being received by the audio processor 208. In another example, the audio analyzing engine 214 can use the detected musical properties to generate an accompaniment (e.g., a bass line generated based on detected chord progressions) which can be played through an audio output 232 (e.g., a speaker or line out).

As described herein, the audio processor 208 can output data (e.g., audio files 224 and metadata 226) to a data store 218. In some cases, outputting data can involve transmitting (e.g., streaming over a network connection) the data to a another device. For example, an audio processor 208 of a smartphone can receive an audio signal 220 from a live instrument 202, record incoming audio data as an audio file 224, analyze the audio data using the audio analyzing engine 214 to generate metadata 226, and transmit the audio file 224 and metadata 226 (e.g., through real-time streaming) to a computer located remote from the smartphone.

Figure 3:
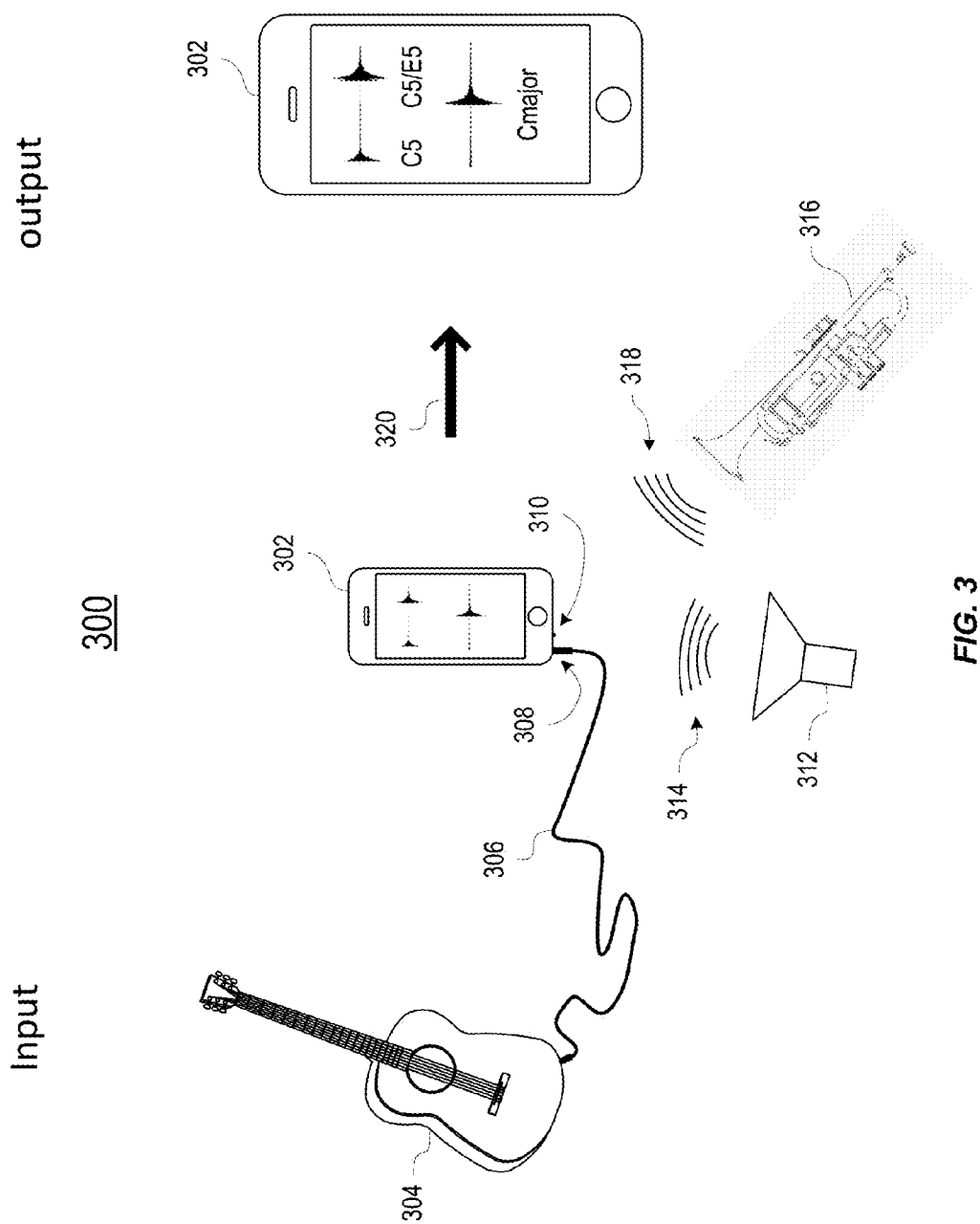
FIG. 3 is a schematic diagram depicting a recording environment, according to certain embodiments of the invention.

FIG. 3 is a schematic diagram depicting a recording environment 300, according to certain embodiments of the invention. An input phase 322 and an output phase 324 are shown. During the input phase 322, the an audio processing device 302 can receive audio data from one or more sources. During the output phase 324, the audio processing device 326, which can be audio processing device 302 at a later point in time or another audio processing device, can process or display metadata 328 related to the audio data received during the input phase 322. An audio processing device 302, 326 can be any suitable device for receiving and processing audio data, such as a smartphone having a line input 308 (e.g., ⅛" headset jack) and a microphone 310. An audio processing device 302, 326 can be the audio processing system 100 of FIG. 1. The elements of FIG. 3 are not necessarily shown to scale.

The audio processing device 302 can receive audio data through a cable 306 coupled to the line input 308. The line input 308 can receive line level, microphone level, or other level input. Any suitable instrument or audio device can be coupled to the cable 306, such as an guitar 304 having an electric pickup. Examples of other suitable audio devices include electric pianos, microphone preamplifiers, a media player (e.g., MP3 player or compact disc player), a media receiver (e.g., radio receiver or internet streaming audio receiver), or other device capable of generating an audio signal. In some cases, the line input 308 can be coupled to multiple instruments or audio devices through the use of splitters, mixers, or other such audio equipment.

The audio processing device 302 can receive audio data through a microphone 310. The audio data can be sound waves 318 from an instrument 316 or sound waves 314 from another audio source. An instrument 316 can be any traditional or non-traditional instrument capable of generating acoustic sound waves detectable by microphone 310. Examples of other audio sources include a speaker 312 (e.g., home stereo speakers or loudspeakers at a public venue), nature-based sounds (e.g., wind noises or water noises), or any other source of sound waves 314.

The audio processing device 302 can receive audio data from one or more audio sources at a time. For example, the audio processing device 302 can receive audio data from multiple instruments 316 through the microphone 310, multiple instruments 314 through the line input 308, or multiple instruments 304, 316 through the line input 308 and microphone 310, respectively.

The audio processing device 302 can perform operations on the incoming audio data, such as those described herein and with reference to audio processor 108 of FIG. 1.

Figure 4:
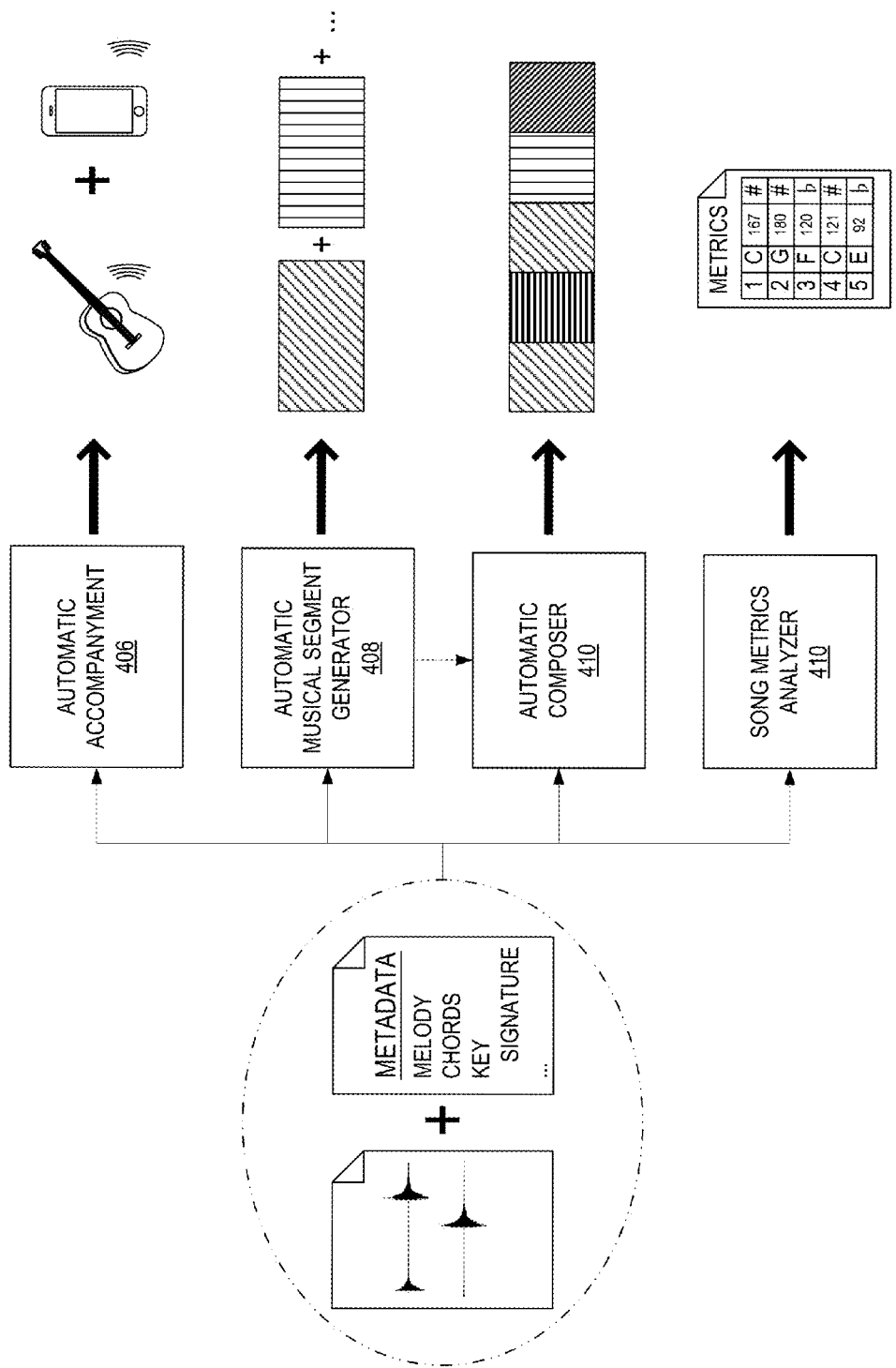
FIG. 4 is a schematic representation of a metadata usage environment, according to certain embodiments of the invention.

FIG. 4 is a schematic representation of a metadata usage environment 400, according to certain embodiments of the invention. The metadata usage environment 400 can be any environment for making use of metadata 404 associated with audio data 124. The metadata 404 and audio data 124 can be stored (e.g., in a file on a data store, such as data store 218 of FIG. 2) or can be provided in real-time (e.g., approximately real-time) from an audio analyzing engine (e.g., audio analyzing engine 214 of FIG. 2).

The metadata usage environment 400 can operate on a suitable device, such as an audio processor (e.g., audio processor 108 of FIG. 1), an audio processing device (e.g., audio processing device 202, 226 of FIG. 2), or any other device suitable for making use of the metadata 404, such as a computer or smartphone. Several examples for using the metadata 404 are described with reference to the metadata usage environment 400, however the metadata 404 can be used in additional ways as well.

The metadata usage environment 400 can include an automatic accompaniment engine 406. The automatic accompaniment engine can use received metadata 404, and optionally received audio data 402, to generate an accompaniment. The accompaniment can be a collection of musical notes, chords, drum beats, or other musical sounds determined to musically fit with the audio data 402. The automatic accompaniment engine 406 can use musical properties identified in the metadata 404 associated with the audio data 402 to determine an accompaniment that satisfies a harmonic or musical fit with the audio data 402.

For example, audio data 402 may include a melody 416 played by a guitar 414. The metadata 404 may include a melody transcription for the melody 416 played by the guitar 414, as well as an identified key signature for the audio data 402. The automatic accompaniment engine 406 can use the key signature and melody transcription from the metadata 404 to identify other notes to play that would fill possible chords at various points in the piece (e.g., at the downbeat of every two measures). A device 418 (e.g., a smartphone or computer) implementing the automatic accompaniment engine 406 can play an accompaniment 420 based on the notes identified to fill possible chords. In some cases, the accompaniment 420 can be saved as another audio file or added to the audio data 402. In other cases, the accompaniment 420 can be performed by the device 418 (e.g., through a speaker, a line output, or a MIDI output to a MIDI instrument) as the audio data 402 is being played. In some cases, where the audio data 402 and metadata 404 are being provided in real-time, the device 418 may generate an accompaniment 420 to play along with a live performer.

The automatic accompaniment engine 406 can use any metadata 404 to generate the accompaniment. In some cases, certain metadata 404 can have a stronger weighting than other metadata (e.g., an identified key can have a stronger weight towards identifying what notes to play in an accompaniment than a melody transcription). The automatic accompaniment engine 406 can assign a confidence score for each attribute of the accompaniment (e.g., when to play a sound, for what duration to play the sound, what notes or chords to include in the sound, and the like) based on how well that attribute fits with the metadata 404.

In an example, a device 418 can be processing audio data 402 and metadata 404 associated with a melody 416 played by a guitar 414. For a section of the piece having metadata 404 that includes a key of G major and an identified chord progression of G, Bm, C, Em over the course of the section, the automatic accompaniment engine 406 may generate the notes G, B, C, and E (e.g., the roots of the chords) to be played over the course of the section. In another example, if the metadata 404 includes a key of G major, an Em chord, and the notes E and B for a particular measure of a piece, the automatic accompaniment engine 406 may generate the note G to be played (e.g., to fill out the chord).

The metadata usage environment 400 can include an automatic musical segmenting engine 408. The automatic musical segmenting engine 408 can use metadata 404 to split audio data 402 into a collection 422 of musical segments 424, 426. Any number of musical segments can be included in a collection 422. The automatic musical segmenting engine 408 can segment the audio data 402 based on musical attributes, such as chords, tempos, key signatures, measures, meters, musical figures, musical motifs, musical phrases, musical periods, musical sections, and other such attributes that are discernable from the audio data 402, metadata 404, or both.

In an example, audio data 402 for a song may have associated metadata 404 that includes rhythmic data and melody transcriptions. The automatic musical segmenting engine 408 can identify any combination of rhythmic patterns and melody patterns and segment the audio data 402 where the patterns repeat to create audio segments 424, 426. In another example, the automatic musical segmenting engine 408 can simply use rhythmic data (e.g., from metadata 404) to determine the downbeat of measures and segment the audio data 402 according to a manually set number of measures.

The metadata usage environment 400 can include an automatic composing engine 410. The automatic composing engine 410 can create a song 428 by piecing together any number of individual audio segments 430, 432, 434, 436. The song 428 can include only unique audio segments 430, 432, 434, 436 (e.g., no audio segment repeats), or can include one or more repeating audio segments (e.g., audio segment 430 in the example shown in FIG. 4). Each audio segment 430, 432, 434, 436 can be a segment 424, 426 (e.g., from the automatic musical segmenting engine 408). In some cases, each audio segment 430, 432, 434, 436 is a distinct audio file that has not been processed by an automatic musical segmenting engine 408.

The automatic composing engine 410 can use metadata 404 associated with the segments 430, 432, 434, 436 to determine a desirable order in which to arrange the audio segments 430, 432, 434, 436. The automatic composing engine 410 can determine a correlation score between the beginning and ending of each audio segment 430, 432, 434, 436 and arrange the audio segments 430, 432, 434, 436 based on the correlation scores. The correlation scores can take into account musical properties, such as key, melodic transcription, chord transcription, rhythmic data, tempo, and other such properties. Other evaluation methods can be used to determine a musical affinity between adjacent segments.

In some cases, the automatic composing engine 410 can specifically select an order of audio segments 430, 432, 434, 436 that is designed to produce an interesting song 428 (e.g., having varied musical properties between adjacent segments). For example, an automatic composing engine 410 may create a song 428 that includes a segment 430 identified as having a first chord progression, followed by a segment 432 identified as having a second chord progression in the same key as segment 430, followed by segment 430 again, followed by a segment 434 identified as having only melody transcription and no chord transcriptions, followed by a segment 436 identified as having a resolution (e.g., a held consonance note after a dissonant chord).

In some cases, one or more segments can be identified as an intro or outro segment, in which case the automatic composing engine 410 can use those segments exclusively at the beginning or end of the song 428, respectively. Intro and outro segments can be identified manually or automatically. Automatically identified intro and outro segments can be identified based on presence in an original piece (e.g., the first and last segments corresponding to the beginning and end of an audio file processed by an automatic musical segmenting engine 408 may be automatically labeled as intro and outro, respectively). Automatically identified intro and outro segments can also be identified based on musical properties of the segment itself.

In some cases, the automatic composing engine 410 can select a subset of audio segments from a larger set of audio segments for use in a song 428. For example, an automatic composing engine 410 may have access to a set of 80 audio segments (e.g., from multiple collections 422 of audio segments created using an automatic musical segmenting engine 408 on a plurality of audio files). The automatic composing engine 410 may select which out of the set of 80 audio segments to use in the final song 428. This selection process can be based on any combination of manual settings (e.g., a user desiring a two minute song) and musical properties (e.g., selecting all segments that match a particular key signature).

In some cases, the automatic composing engine 410 can allow a user to manipulate the order of the segments. The automatic composing engine 410 can store historical information related to the past manual placement of audio segments in relation to other audio segments and in relation to an overall song 428. The automatic composing engine 410 can learn from this historical information and use the historical information to improve its audio segment ordering and selection processes. In some cases, the historical information can be used to adjust the weighting of certain musical properties and can recognize patterns in audio segment placement.

The metadata usage environment 400 can include a song metrics analyzing engine 412. The song metrics analyzing engine 412 can analyze any attributes of the metadata 404 associated with audio data 402. The song metrics analyzing engine 412 can be used to determine patterns, relationships, averages, or other metrics associated with musical properties of the audio data 402. For example, the song metrics analyzing engine 412 can determine the most common chord used in a piece, the number of times each note was used in a piece, the average tempo or tempo changes throughout a piece, and other metrics. The song metrics analyzing engine 412 can provide metrics data 438 to other engines or devices for further use. Metrics data 438 from multiple songs can be compared and further analyzed, such as to determine correlations between multiple songs.

In an example, a song metrics analyzing engine 412 can be used on a set of songs to generate metrics data 438 regarding the key signatures, chords, notes, tempos, and other musical properties of each song in the set. Comparison of the metrics data 438 can be used to order the songs (e.g., for a playlist or an album) in a meaningful way. For example, metrics data 438 can be used to order similar songs adjacent one another. In another example, metrics data 438 can be used to order songs so that similar songs (e.g., with similar chord or note distributions, similar tempos, similar keys, or other similar characteristics) are not directly adjacent one another (e.g., to improve variety in a playlist or album).

The ability to obtain audio data 402 and associated metadata 404, as well as to use the audio data 402, metadata 404, or both brings substantial benefit to music enthusiasts, including performers, technicians, and listeners alike. For example, the use of an audio processor 208 having an automatic start/stop engine 210 as described in FIG. 2 can simplify the recording process for a musician. As another example, the ability to analyze incoming audio data to generate metadata (e.g., metadata 226 generated by the audio analyzing engine 214 of FIG. 2) can enable many different uses of the recordings or live performances (e.g., as seen in FIG. 4). Furthermore, the aspects described herein will enable musicians to record, analyze, and manipulate their music in new and unique ways.

Start/Stop Engine

The start/stop engine operates to automatically start or stop a recording in response to detecting an audio input determined to be a musical performance. For example, a musician can simply begin playing an instrument and the start/stop engine will automatically detect the musical performance, begin a recording of the musical performance, and end the recording when the musician stops playing the instrument. This is achieved (for starting a recording) by identifying a transition between a detected silence and a detected musical performance (audio) in a sample of audio data and automatically beginning the recording at that transition. Aspects of automatically starting and stopping a recording are described in the embodiments that follow. The term "musician," "user," "person," etc., can be used interchangeably throughout this disclosure.

Figure 5:
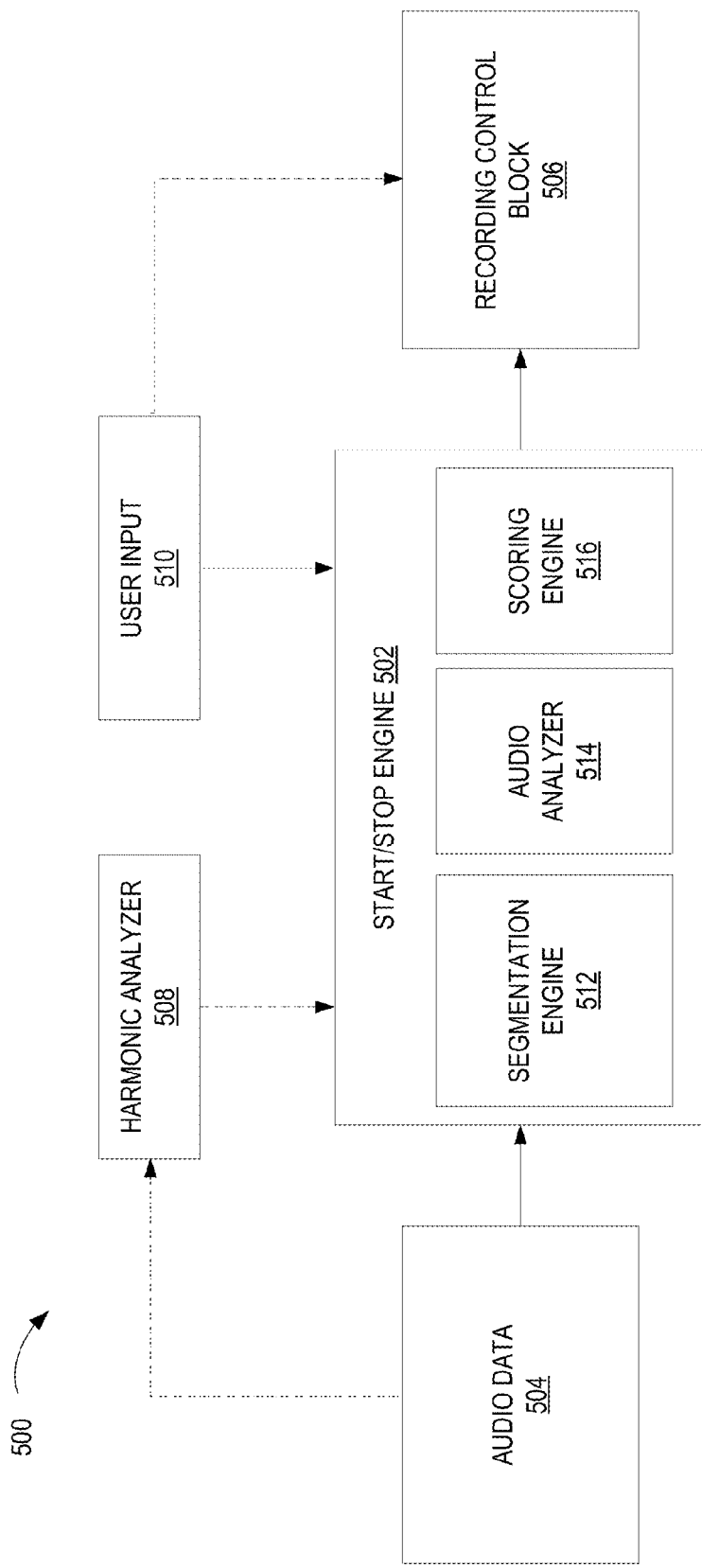
FIG. 5 shows a system for automatically starting and stopping an audio recording, according to certain embodiments of the invention.

FIG. 5 shows a system 500 for automatically starting and stopping an audio recording, according to certain embodiments of the invention. System 500 includes a start/stop engine 502 having a segmentation engine 512, an audio analyzer 514, and a scoring engine 516. Inputs to start/stop engine 502 include audio data 504, user input 510, and harmonic analyzer 508. The output of start/stop engine 502 feeds recording control block 506. System 500 can be embodied in one or more pieces of hardware, such as a single device (e.g., smartphone or computer), multiple devices directly coupled together (e.g., a rack of equipment), multiple devices remotely coupled together (e.g., multiple computers communicatively coupled together via a network), or any combination thereof. System 500 may incorporate computer software and/or firmware to implement the functions embodied therein. Furthermore, the various engines (e.g., segmentation engine, scoring engine, etc.) may be embodiment as a single entity or multiple entities.

Audio data 504 feeds segmentation engine 512 of start/stop engine 502. In some embodiments, audio data 504 may also feed harmonic analyzer 508. Audio data can include any data that is representative of a sound. Audio data can be provided as an audio signal 220 or an audio file 222. Audio data can be live audio (e.g., streamed, live-recording, etc.) or previously recorded data (e.g., .wav file, .aiff file, mp3, etc.).

Segmentation engine 512 receives audio data 504 and divides the audio data into a first set of consecutive segments and a second set of consecutive segments. In some embodiments, the segments are evenly divided into a uniform length of time. In an exemplary embodiment, the first and second sets of segments may be 2.5 s in length with each segment being 0.5 s. Audio data 504 can be received and segmented in a first-in, first-out (FIFO) arrangement.

Audio analyzer 514 can examine aspects of audio data 504 to determine whether or not a musical performance is being played. Audio analyzer 514 receives the first and second sets of consecutive segments from segmentation engine 512 and performs various audio analyses including measuring an average energy and peak amplitude (peak value) for each segment (or subset thereof) of the first and second set of segments. Audio analyzer 514 may also identify harmonic content within the audio data in conjunction with (or separate from) harmonic analyzer 508, as further discussed below.

Scoring engine 516 can determine a silence score or a music score. A silence score is calculated to determine whether silence is likely detected. Similarly, a music score is calculated to determine whether music is likely detected. In some embodiments, a score mechanism for the silence score and music scores utilize peak values and RMS values. For instance, for each 0.5 second time slice a score may increase/decrease by 1 for the value being above/below a corresponding threshold. The score threshold is typically at 4 out of 5, e.g., if 2.0 seconds out of 2.5 seconds the values were above the corresponding threshold then the resulting start/stop condition is determined to be true. In the case of the silence score, for instance, if an RMS value for a set of segments is high, then that passage is not silent. If the RMS value is below −40 dB, then this may be set as the noise floor. If a next segment in the set is within that range, the silence core can be increased. For RMS values that are significantly higher than the noise floor, the score is reduced. This principle conversely applies to the music score More specifically, scoring engine 516 can determine a silence score for the first set of segments that characterizes how silent or quiet the audio data is based on one or more of the average energy, peak amplitude, and harmonic content for each segment (or subset thereof). The more segments that fall below a certain average energy or peak amplitude, or do not register harmonic content, the higher the silence score may be. If the silence score is sufficiently high (above a first predetermined threshold), the first segment is determine to be silent. In some cases, consecutive segments that register as silent can generate a higher silence score.

Scoring engine 516 can also determine a music score for the second set of segments that characterizes how loud and likely "musical" the audio data is based on one or more of the average energy, peak amplitude, and harmonic content for each segment (or subset thereof). The more segments that rise above a certain average energy or peak amplitude, or register as harmonic content, the higher the music score may be. If the music score is sufficiently high (above a second predetermined threshold), the second segment is determined to contain audio corresponding to a musical performance. Consecutive segments that register as a musical performance generate a higher music score.

Harmonic analyzer 508 can analyze audio data 504 to determine if it includes harmonic content. Harmonic content may include detected notes, scales, chords, time signatures, and the like. If harmonic content is detected, there is a higher likelihood that audio data 504 includes musical performance data. Harmonic analyzer 508 may independently determine the presence of harmonic content in audio data 504. In some embodiments, harmonic analyzer 508 is integrated with start/stop engine 502. As mentioned above, scoring engine 516 can factor in harmonic content to help inform more accurate silence/music scores.

User input 510 can include any user configurable attribute that can be used to control aspects of the start/stop engine 502. For example, user input 510 may include user-specified predetermined thresholds for the silence and music scores. User input 510 may include manual override controls to manually start and/or stop a recording. In some embodiments, user input 510 may set segmentation duration, segmentation symmetry (between adjacent segments), the number of segments for each set of segments, etc. Other user configurable controls are possible as would be appreciated by one of ordinary skill in the art with the benefit of this disclosure.

Recording control block 506 controls the starting and stopping of a recording, according to certain embodiments of the invention. If scoring engine 516 determines that the silence and music scores are above their predetermined thresholds, a control signal can be sent to recording control block 506 to start and/or stop a recording. Alternatively, a recording can be started or stopped in response to a manual user input 510.

A more comprehensive description of the automatic start/stop recording process is further discussed below at least with respect to FIGS. 6-11.

Automatic Music Start

Figure 6:
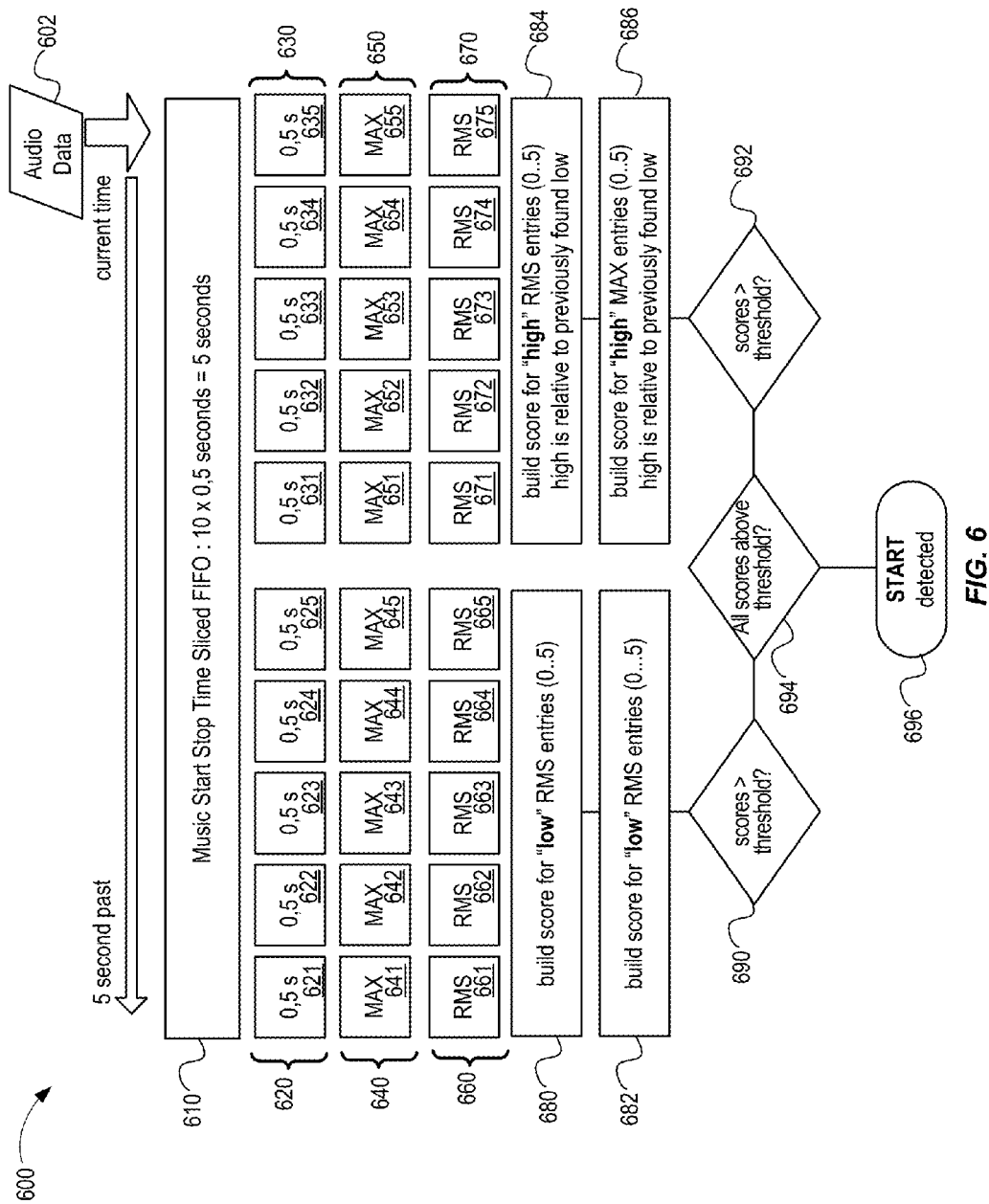
FIG. 6 is a simplified flow chart showing a method for automatically starting a recording, according to certain embodiments of the invention.

FIG. 6 is a simplified flow chart showing a method 600 for automatically starting a recording, according to certain embodiments of the invention. The various methods described herein and shown, for example, in FIGS. 6-11 and 16 can be performed by processing logic that may comprise hardware (e.g., circuitry, dedicate logic, etc.), software (which as is run on a general purpose computing system or a dedicated machine), firmware (embedded software), or any combination thereof. In one embodiment, method 600 is performed by aspects of systems 200 and 500 of FIGS. 2 and 5 including processing unit 208.

Step 602 includes receiving audio data (504) by a processor. Audio data can include any data that is representative of a sound. Audio data 602 can be provided in real-time as an audio signal 220 or an audio file 222 and may be sampled and/or stored in a memory buffer (e.g., data store 218) as it is received (step 610). In some embodiments, audio data 602 is stored and analyzed in 5 second intervals, although other time intervals are possible. The time interval can be a current time minus the designated interval (e.g., present time to 5 seconds prior). The audio data 602 is then divided (i.e., time-sliced) in a first-in, first-out (FIFO) arrangement into a first set of consecutive segments 620 (segments 621-625) and a second set of consecutive segments 630 (segments 631-635). Each set of segments contains an equal number individual segments (e.g., 5 segments) having equal time intervals (0.5 seconds), however any number of sets, segments, and durations are possible and symmetry between sets and segments is not required.

Referring to FIG. 6, the first set of consecutive segments 620 includes 0.5 second sliced intervals that are analyzed to determine a corresponding maximum peak value 640 and a root-mean-square value 660 of the audio slice for each individual segment in the first set (or subset thereof). The second set of consecutive segments 630 includes 0.5 second sliced intervals that are analyzed to determine a corresponding maximum peak value 650 and a root-mean-square value 670 of the audio slice for each individual segment in the second set (or subset thereof).

The silence score can be a dynamic value that is affected by each segment of the first set of consecutive segments based on their corresponding RMS entries 660 (step 680) and max values entries 640 (step 682). "Low" RMS and peak values can increase the overall silence score and consecutively "low" RMS and peak values can have a significant effect (e.g., multiplying effect) on the silence score as this would likely reflect a period where no music is being played. "Low" RMS and peak values would correspond to low audio levels, transients, and the like, and would likely be perceived as quiet or low volume passages.

The music score can be a dynamic value is affected by each segment of the second set of consecutive segments based on their corresponding RMS entries 670 (step 684) and max values entries 650 (step 686). "High" RMS and peak values can increase the overall music score and consecutively "high" RMS and peak values can have a significant effect (e.g., multiplying effect) on the music score as this would likely reflect a period where music is being played. "High" RMS and peak values would correspond to high audio levels, transients, and the like, and would likely be perceived as "loud" or high volume passages as compared to the relative "low" RMS and Peak values.

At step 690, the silence score is measured against a first predetermined threshold value, which may a default value, user defined, or a selectable factory preset. The first predetermined value should be configured such that non-consecutive spurious transients, for example, that may correspond to background noises would not necessarily significantly reduce the silence score. The sensitivity of the first predetermined value can be adjusted based on background noise, type/number of instruments, considerations, as would be appreciated by one of ordinary skill in the art.

At step 692, the music score is measured against a second predetermined threshold value, which may a default value, user defined, or a selectable factory preset. The second predetermined value should be configured such that non-consecutive spurious transients, for example, that may correspond to background noises would not necessarily significantly increase the music score. The sensitivity of the second predetermined value can be adjusted based on background noise, type/number of instruments, or other considerations, as would be appreciated by one of ordinary skill in the art.

At step 694, if both the silence and music scores are above their corresponding predetermined thresholds, then audio data 602 is recorded and begins at the transition between the first and second sets of segments (e.g., at (−)2.5 s).

Figure 7:
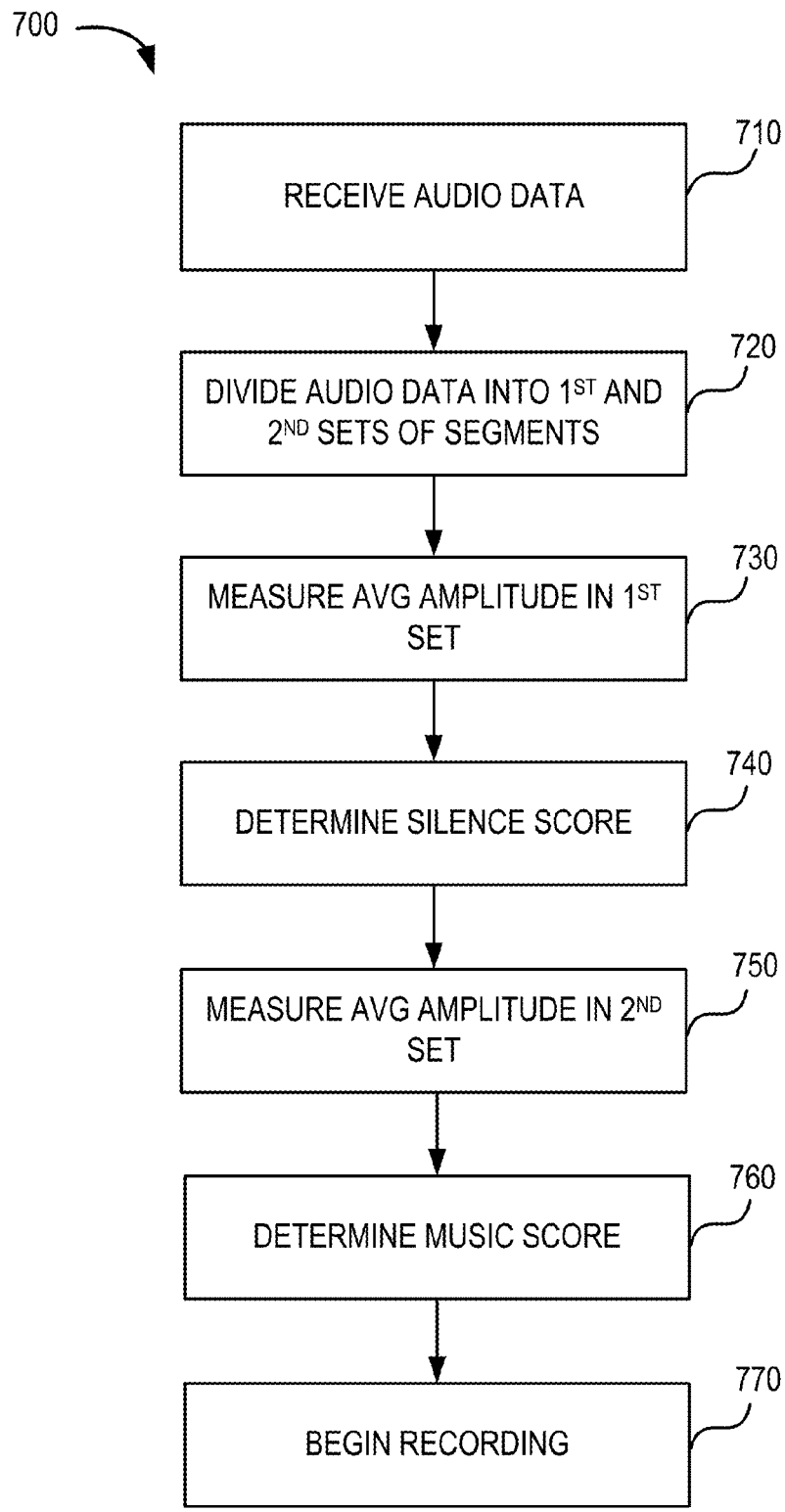
FIG. 7 shows another simplified flow chart showing a method for automatically starting a recording, according to certain embodiments of the invention.

FIG. 7 shows another simplified flow chart showing a method 700 for automatically starting a recording, according to certain embodiments of the invention. In one embodiment, method 700 is performed by aspects of systems 200 and 500 of FIGS. 2 and 5 including processing unit 208.

At step 710, a processor 208 receives audio data (e.g., audio data 504). In some embodiments, audio data is automatically received upon launch of an application (e.g., any application operating start/stop engine 502 and performing the operations described in FIG. 6). At step 720, a segment of the audio data is captured and stored in memory and divided (e.g., time sliced) into a first set of consecutive segments and a second set of consecutive segments, with the second set of segments occurring after the first set of segments (e.g., set 620, 630). In an exemplary non-limiting embodiment, the first and second set of consecutive segments each span 2.5 seconds with five 0.5 s segments each for a total of 5 seconds.

At step 730, an average or RMS value is analyzed and measured in each segment of the first set of segments. In some embodiments, a peak (max) value (amplitude) can also be measured. A silence score is determined (step 740) based on at least one of the RMS or peak measurements. The silence score may be increased with increasing numbers of segments in the first set of segments having relatively low peak or RMS values (i.e., low volume transients), as would be appreciated by one of ordinary skill in the art. The silence score may increase substantially with successive consecutive segments having low peak or RMS values. In some embodiments, an absolute RMS threshold (e.g., 40 dB) can be used to distinguish between music and silence. That is, a music recording must show RMS values above this threshold to register as music. Additionally there may be a relative RMS threshold of 12 dB that needs to be surpassed in the transition from the measured silence RMS and the music RMS. For example, a noisy environment may be "silent" near 40 dB (e.g. 39 dB), making it difficult to differentiate music from silence with a 40 dB threshold. In this case, the system 500 "learns" the new silent floor and sets a baseline value so that energy levels interpreted as music are measured relative to that value. Thus, a 12 dB relative RMS threshold can ensure that the difference between a measured silence and sound (music) is substantial enough to accurately detect. In the example above, with silence at 39 dB due to background white noise, the RMS threshold may be set to 51 dB. Other thresholds and relative thresholds can be used as needed.

At step 740, an average or RMS value is analyzed and measured in each segment of the second set of segments. In some embodiments, a peak value can also be measured. A music score is determined (step 760) based on at least one of the RMS or peak measurements. The music score may be increased with increasing numbers of segments in the second set of segments having relatively high peak or RMS values (i.e., high volume transients), as would be appreciated by one of ordinary skill in the art. The music score may increase substantially with consecutive segments having high peak or RMS values. In some embodiments, a high value may mean that the RMS of music is at least 12 dB higher than in a previously learned silence passage and that RMS is above −40 dB.

At step 770, the audio data is recorded if the silence score is above a first predetermined value and the music score is above a second predetermined value. In some embodiments, the music score can further be based, in part, on a relative difference between average energies of the one or more of the second set of segments as compared to average energies of the one or more of the first set of segments. A relative difference in a "silent" segment versus a "loud" segment can resolve any false triggering issues that may occur in a noisy environment with a high noise floor that may cause inaccuracies in characterizing silent and music segments. For example, a user may try to record a performance at home with her washing machine operating in the background. The noise from the washing machine may be as high as 30 dB—which is already in the range of a valid musical performance. Embodiments of the invention can recognize the background noise and characterize it as such, and set this as the new noise floor. Thus, a "loud" segment will have to be louder than the new noise floor by the requisite amount per normal operation.

In some embodiments, the musical score can be recalculated at a later time with greater accuracy. For instance, method 700 may determine a likely starting point for a musical performance within the 5 second interval. However, further analysis within that interval may yield greater accuracy in determining the actual starting point. For instance, smaller time intervals can be used for greater resolution. Other filters may be used for improve accuracy (e.g., harmony detection, transient detection, etc.). Thus, a more accurate starting point (or stopping point) can be determined and the recording can be amended accordingly.

In some embodiments, the incoming audio data may not contain any musical performance data for some time. In this example, successive segments of 5 seconds of audio is captured, divided, and analyzed in a FIFO input scheme, one after another, until a start recording event is detected. In this scenario, it is possible that periods of time that occur during the analysis for a first 5 second segment and capturing/dividing the next 5 second segment may not be analyzed. For example, a 5 second span of time may take an additional 1-2 seconds to analyze. Thus, a second 5 second span may not be captured until 2 seconds after the first 5 seconds is analyzed. In such cases, the 5 second interval provides enough time for the start/stop algorithm to identify a start event that may occur during the lost 1-2 second interval. In further embodiments, multiple sets of 5 second samples can be analyzed in parallel to account for the lost processing time discussed above. In some embodiments, although any short interval can be examined at a time (e.g., 5 second interval), larger intervals are continuously stored and deleted in memory as needed (e.g., memory 218) to allow access to audio data as far back in time as needed.

It should be appreciated that the specific steps illustrated in FIG. 7 provide a particular method of automatically starting a recording, according to certain embodiments of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 700.

Automatic Music Stop

Figure 8:
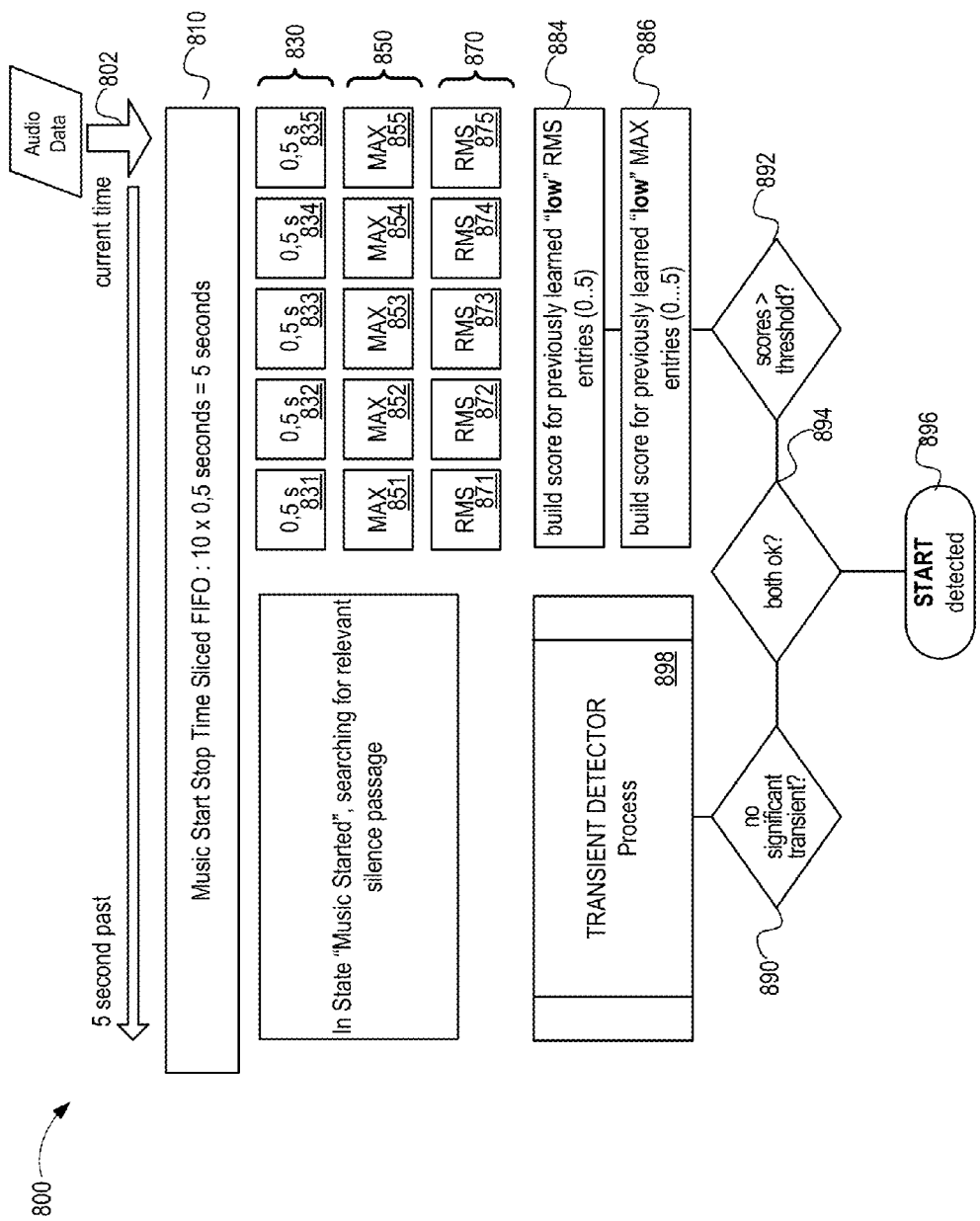
FIG. 8 is a flow chart showing a method for automatically stopping a recording, according to certain embodiments of the invention.

FIG. 8 is a flow chart showing a method 800 for automatically stopping a recording, according to certain embodiments of the invention. In one embodiment, method 800 is performed by aspects of systems 200 and 500 of FIGS. 2 and 5 including processing unit 208.

FIG. 8 can be a continuation of FIG. 6 where the recording processes has already begun and the system (e.g., system 500) is continuously analyzing the audio input (audio data) to determine when to stop recording. Thus, after recording begins, audio data 802 is sampled/stored and divided (i.e., time-sliced) in a first-in, first-out (FIFO) arrangement into a third set of consecutive segments 620 (segments 831-835). The third set of segments contains 5 segments having equal time intervals (0.5 seconds), however any number of sets, segments, and durations are possible and symmetry between sets and segments is not required.

Referring to FIG. 8, the third set of consecutive segments 830 are analyzed to determine a corresponding maximum peak value 850 and a root-mean-square value 870 of an audio slice for each individual segment in the third set (or subset thereof). The silence score can be a dynamic value is affected by each segment of the third set of consecutive segments based on their corresponding RMS entries 870 (step 884) and max values entries 850 (step 886). "Low" RMS and peak values can increase the overall silence score and consecutively "low" RMS and peak values can have a significant effect (e.g., multiplying effect) on the silence score as this would likely reflect a period where no music is being played. "Low" RMS and peak values would correspond to low audio levels, transients, and the like, and would likely be perceived as quiet or low volume passages.

At step 892, a silence score is measured against the first predetermined threshold value, which may be a default value, user defined value, or a selectable factory preset. The first predetermined value should be configured such that non-consecutive spurious transients that may correspond to background noises would not necessarily significantly reduce the silence score. The sensitivity of the first predetermined value can be adjusted based on background noise, type/number of instruments, considerations, as would be appreciated by one of ordinary skill in the art.

In some embodiments, a transient detector process 898 can be included in the automatic stop process. Transient detector 898 may scan the audio input for significant transients that have sufficiently high absolute value, RMS values, or peak values that are characteristic of audio data containing music (step 890). Transient detector 898 operates as an additional condition for ensuring that silence is detected. If At step 894, if no significant transients are detected and the silence score is above the first predetermined value (step 892), then a stop command is issued and the recording stops. In some embodiments, the stop is initiated at the end of the third set of segments.

Figure 9:
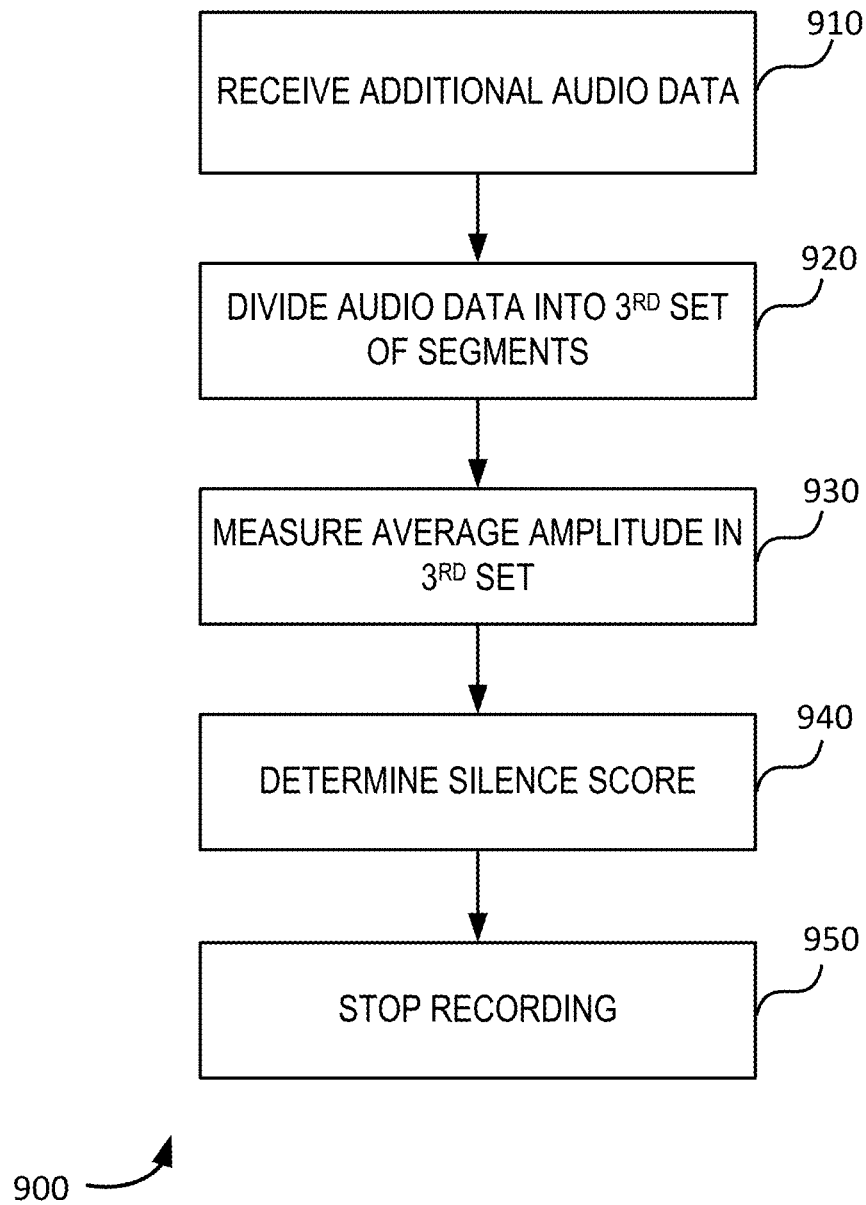
FIG. 9 shows another simplified flow chart showing a method for automatically stopping a recording, according to certain embodiments of the invention.

FIG. 9 shows another simplified flow chart showing a method 900 for automatically stopping a recording, according to certain embodiments of the invention. In one embodiment, method 900 is performed by aspects of systems 200 and 500 of FIGS. 2 and 5 including processing unit 208.

At step 910, a processor 208 receives additional audio data (e.g., audio data 504). The additional audio data may be a continuation of audio data received after an automatic start process, as discussed above at least with respect to FIGS. 6-8. At step 920, a segment of the audio data is stored in memory and divided (e.g., time sliced) into a third set of consecutive segments, with the third set of segments occurring after the first and second sets of segments, as shown in FIG. 6. In an exemplary embodiment, the third set of consecutive segments spans 2.5 seconds with five 0.5 s segments.

At step 930, an average or RMS value is analyzed and measured in each segment of the first set of segments. In some embodiments, a peak value can also be measured. A silence score is determined (step 940) based on at least one of the RMS or peak measurements. The silence score may be increased with increasing numbers of segments in the first set of segments having relatively low peak or RMS values (i.e., low volume transients), as would be appreciated by one of ordinary skill in the art. The silence score may increase substantially with consecutive segments having low peak or RMS values. At step 950, the recording is stopped if the silence score is above a first predetermined value.

It should be appreciated that the specific steps illustrated in FIG. 9 provide a particular method of automatically stopping a recording, according to certain embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 900.

Automatic Music Start/Stop Using Harmonic Analysis

A harmonic analyzer can enhance the music start/stop algorithms by not only looking for energy values (e.g., RMS, peak amplitude), but also analyzing harmonic content to determine if an audio input contains musical content.

One aspect of harmonic analysis includes a partial tracker. A partial tracker can intensify frequency peaks in frequency data (e.g., from audio data 504, 602, 802, etc.), such as those related to notes and overtones present in the audio segment. A partial tracker can identify peak frequencies that are maintained over a portion of or all of the duration of the audio segment. These identified frequencies can be intensified and provided as partial tracker data.

Typically, frequency data will include one peak that will be the peak with the lowest frequency. For a given time frame, from the lowest peak frequency and on, the partial tracker examines all peaks with frequencies that are available within the next two octaves, i.e. from the lowest frequency up to 4 times that frequency. Within this range, a musical instrument would typically produce fundamental frequencies and first harmonics that lie on integer multiples of semitones (e.g., frequencies that fall on a "semitone grid"). For example, this may include all notes (non-bent or detuned) on a piano or guitar tuned to a Western scale (e.g., major, minor, etc.). The more frequency peaks are detected that do not lie on the semitone grid, the less likely it comes from a musical instrument (or a musical instrument not in tune). Every frequency found in the semitone grid further supports the notion that the audio input corresponds to notes/chords played on a musical instrument. The first harmonic is 12 semitones above the fundamental frequency, as would be appreciated by one of ordinary skill in the art. Therefore, frequencies within the first octave above the fundamental frequency would likely have overtones between the first and second octaves of the fundamental frequency.

In practice, a typical partial tracking process may include receiving audio data and identifying the fundamental frequencies (peaks). Using the fundamental frequencies, all additional frequency peaks should be between the fundamental frequency and four times the fundamental frequency (i.e., two octaves). In each case, the frequency peaks should be on integer multiples of semitones.

The process of determining whether music is present in the audio data includes determining, within an octave, whether all peaks are integer multiples of semitones above the lowest fundamental frequency. The first overtone is 12 semitones. The second overtone is not necessarily on a semitone integer. However, the third overtone integer (3× the fundamental frequency) is not an semitone integer way, and thus is not generally used in the calculus of determine the presence of music in audio data. Equations (1) and (2) can be used to determine the frequency of the $n^{th}$ semitone.

$$\text{Freq}_n = \text{Freq}_0 \times 2^{(1/12)^n} \tag{1}$$

or $$\text{Freq}_n = \text{Freq}_0 \times \sqrt[12]{2^n} \tag{2}$$

In equations (1) and (2), $\text{Freq}_0$ is the fundamental frequency, $\text{Freq}_n$ is the frequency of the $n^{th}$ semitone, and n is the number of semitones above the fundamental frequency.

Because audio content may be a complex combination of musical and non-musical sounds, a binary determination of whether music is present or not is usually not possible. Therefore, a scoring mechanism can be used to determine a likelihood of music being present in the audio data—similar to the scoring criteria for levels and RMS values as discussed above. The score corresponding to harmonic analysis and partial tracking may be referred to as a frequency score. In some embodiments, a number of time slices are analyzed (e.g., 0.5 s slices over 2.5 s) and each frequency peak that corresponds to the criteria above (e.g., within 2 octaves, falls on integer multiples of semitones, etc.) increases the frequency score, and each frequency peak that violates the criteria reduces the score. The frequency score can be set between 0 and 1 where all peaks meeting the criteria would produce a frequency score of '1' and all peaks violating the criteria would produce a frequency score of '0' (like a percentage scheme). Typically, after a duration (e.g., 0.5 seconds), the total score is stored along with level and RMS values to determine whether or not there is a music start, as further described and illustrated below with respect to FIG. 10. Since audio data will rarely indicate a score of '1,' even with musical content, a threshold value for the frequency score can be used such as 0.7 or 0.8. Any suitable threshold can be used, as would be appreciated by one of ordinary skill in the art. In some implementations, the partial tracking step would be an additional step to determine whether or not to start or stop recording along with the level and/or RMS values discussed above. Thus, some embodiments may require an AND relationship where all conditions must be true, rather than a summation or average relationship between conditions. For example, if RMS and peak level indicate a music start scenario, but the frequency score is below a threshold value, then the music start is rejected due to the non-musical content of the audio data.

In certain implementations, audio data can be sampled during periods determined to be silent to determine its "footprint." For instance, frequency peaks associated with contributors to white noise (e.g., appliances, 60 Hz hum, outside noise, etc.) can be stored and recalled later to filter out these noises during audio input analysis (e.g., during pitch detection for talking rejection analysis).

In some embodiments, harmonic analysis can be enabled or disabled by a user. For instance, a recording of a percussive instrument (e.g., drums) may not include sufficient harmonic content. In such cases, a rhythmic detector may be used instead. Perhaps the level and energy detectors always run, and the pitch-based analysis could be supported by the rhythmic detector (e.g., either pitch or rhythm (periodicity of transient events) must be satisfied). Therefore, if the pitch detector doesn't sense a musical instrument, but a rhythm detector detects highly periodic rhythms, the music start condition may be satisfied (e.g., an assumption is made that percussion is being recorded).

Harmonic analysis can be used for a wide variety of scenarios beyond simple starting and stopping a recording of a musical performance. For instance, a radio input (e.g., AM/FM radio, or streaming internet radio) or Podcast can be analyzed and automatically split into musical sections and conversation sections. In some embodiments, auto-accompaniment algorithms can be used to automatically generate, e.g., a drum beat that compliments an audio input (see U.S. Pat. No. 9,012,754 and see discussion with respect to FIG. 14). For example, when a beat-mapping algorithm analyzes an audio file to find beats, it attempts to detect transients (e.g., localized instances of high energy spikes in the audio data) to try and detect rhythms. It then overlays various possible rhythms on the transients and picks a rhythm that best fits. If the data being analyzed includes irrelevant transients (e.g., from dropping a microphone, accidentally hitting a guitar on a table, or anything else), the analyzed rhythm may not be as accurate. By automatically excluding any irrelevant transients before music has started or after music has stopped (via music start/stop recording) the rhythmic analysis scan be improved.

Harmonic analysis may be used for speech detection. As mentioned above, musical instruments show a very characteristic overtone structure and time dependency. In contrast, there is usually very little semitone relation in speech. For example, consonants ("s," "t," "c," etc.) are more percussive and do not have specific overtones. Some vowels (e.g., "a" or "c") have overtones similar to an instrument, but in the course of a normal conversation, vowels are usually followed by other tones that are not overtones (e.g., due to consonants). Thus, speech does not typically show a spectrum or frequency characteristic that relates to semi-tone grids and vary widely over time. This characteristic of speech can be used to identify speech and cut or parse it from musical data. In some embodiments, speech detection can be used for volume control (e.g., detect talking in commercials and auto-control the volume during that time).

Alternatively, harmonic analysis can be used for detecting different instruments to limit start/stop recording to periods where percussion is not detected, rather than musical data that corresponds to the frequency criteria above.

In some embodiments, harmonic analysis can be an enhancement of music stop. In some cases, music stop can be based on levels (e.g., RMS) going to silent for a sufficient amount of time. This tactic may not work well for a slowly decaying chord at the end of a piece (e.g., fade out). At some point, a threshold silence level may be met and the recording will be cut off before the performance is finished. For instance, an identified silence level (e.g., −50 db) might change during a performance. If you force −50 db again, you may not register silence if you only get −49 db (e.g., due to change in background noise). That is, the audio input may never reach the initial silence level again and, as a result, the recoding may not stop. To resolve this issue, if there is a strong indication of a musical instrument (e.g., integer semitones), the silence level can be adjusted to accommodate this, the recording may continue after detecting a music stop condition (e.g., via RMS/peak levels) for some short duration (e.g., 5 seconds), or the recording maybe continue until an indication of a musical instrument is gone, regardless of RMS or peak levels.

There are a number of ways of determining whether music is still present in the audio data, even when RMS and peak levels are low. This is because a decaying note (e.g., diminuendo) will still have a fundamental frequency with overtone peaks slowly disappearing starting from the highest overtones down to the lowest ones. This can be tracked and considered in the start/stop calculus. Here, a frequency score is calculated based on the stability of the number of peaks.

Thus, the frequency relation of the remaining peaks is no longer relevant—only the number of still measurable peaks are considered. When this score for stable peaks reaches a certain threshold value (e.g., 0.9), a music stop is possible. This method of analysis can be combined with the RMS and peak level requirement.

If the frequency peaks are zero, it is real silence as even non-musical sounds would exist as some frequency in the audio spectrum (20-20 KHz). If the number of peaks does not change over a longer period of time, typically those peaks are from background noise. If the number of peaks changes, it may be assumed that music is still being played and the system may not stop recording.

Figure 10:
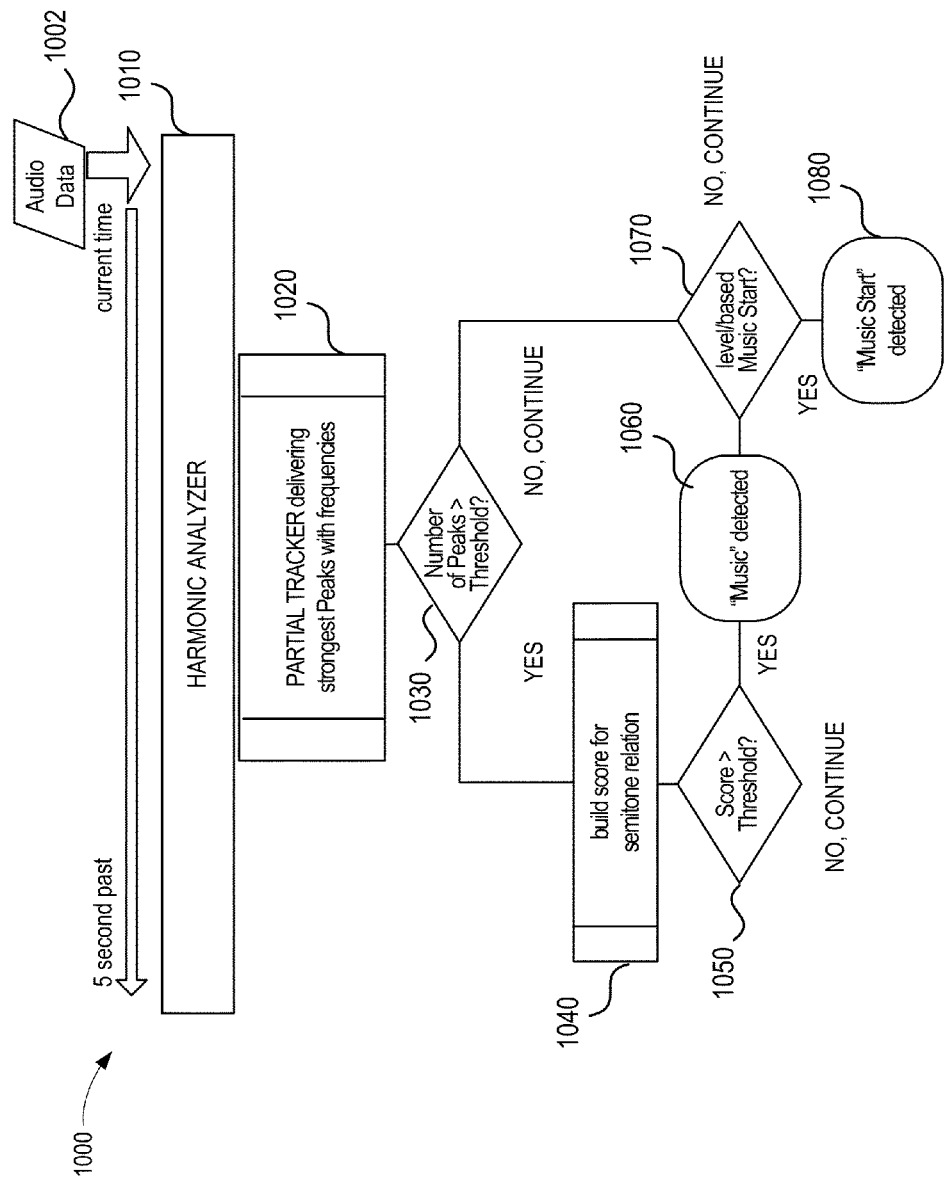
FIG. 10 is a flow chart showing a method for automatically starting a recording, according to certain embodiments of the invention.

FIG. 10 is a flow chart showing a method 1000 for automatically starting a recording, according to certain embodiments of the invention. In addition to analyzing RMS and peak values to determine whether or not to start or stop a recording, harmonic content can be used as additional metric for improved accuracy. Harmonic content (e.g., chords, notes, semitone relationships, etc.) is a good indicator that an audio input includes musical content, which further informs the decision to start or stop a recording.

At step 1010, a harmonic analyzer receives audio input 1002 and performs a harmonic analysis. In some embodiments, the harmonic analyzer may be song metrics analyzer 410 of FIG. 4. Audio input 1002 can be similar to the audio data described above with respect to FIGS. 2-3 and FIGS. 5-6. FIG. 10 shows audio input 1002 as the last 5 seconds of audio data. Other sample lengths are possible (e.g., 3 seconds, 10 seconds, etc.).

At step 1020, a partial tracker process analyzes audio input 1002 and identifies the strongest peaks having frequencies. The frequency analysis of identifying a fundamental frequency and overtones, etc., in a series of time slices (e.g., 0.5 s) to determine the presence of music is further discussed above. At step 1030, the number of peaks with frequencies are compared to a peak frequency threshold value. The peak frequency threshold value may be any suitable number of suitably strong peaks having certain frequencies. The required strength (amplitude) of the peaks, the required number of peaks, and/or the audio frequencies associated with the peak frequency threshold value e.g., overtones with respect to semi-tone scale) would be understood and ascertainable by one of ordinary skill in the art with the benefit of this disclosure.

If the number of peaks is greater than the peak frequency threshold value, than a frequency score for semitone relation is generated (step 1040), as further discussed above. If the frequency score is not greater than a third predetermined value, then audio input 1002 is still received but recording does not begin. If the frequency score is greater than a third predetermined value, then music is detected (step 1060) (via partial tracking) and method 1000 continues to step 1070. In some embodiments, a score of '0' would indicate no harmonic content per the partial tracking algorithm previously discussed. A score of '1' would indicate an absolute indication of musical content. The third predetermined value (or threshold value) can be between 0.6 and 0.9, which may affect both accuracy and sensitivity, as would be appreciated by one of ordinary skill in the art. The third predetermined value can be any suitable value.

Referring back to step 1030, if the number of peaks is not greater than a peak frequency threshold value, then method 1000 continues on to step 1070. At step 1070, if "music" is detected (see step 1060), but the level-based music analysis (i.e., RMS and peak analysis) does not support a start condition (e.g., both silence and music scores are above their predetermined thresholds), then audio data is still received, but recording does not begin. If both a "music" condition is detected (based on harmonic analysis—step 1060) and the level-based music analysis supports a start condition, then the recording starts and audio input 1002 is stored (e.g., in data store 218). In some embodiments, the harmonic analyzer and underlying components (e.g., partial tracker, scoring engine, etc.) may be realized in any suitable combination of hardware, software, firmware, or combination thereof, including the architectures described in FIGS. 2-5. Although FIG. 10 illustrates an alternative method of starting a recording session, it should be understood that similar principles (e.g., not detecting music or strong peaks with frequencies) could be used to auto stop a recording. In some embodiments, detecting music (step 1060) may start or stop a recording despite the state of the level-based analysis.

Figure 11:
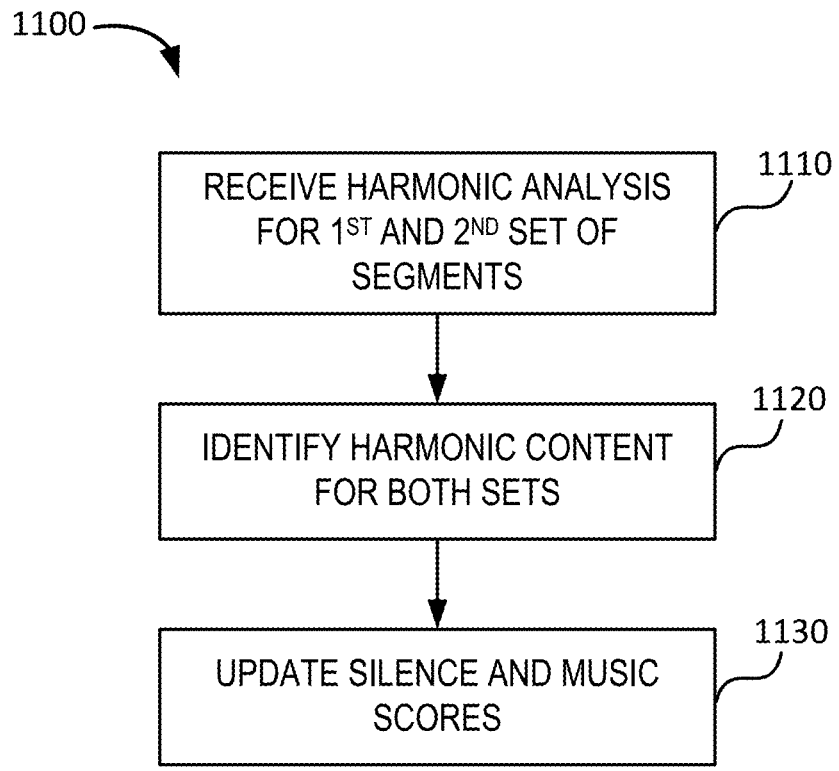
FIG. 11 shows another simplified flow chart showing a method for automatically stopping a recording, according to certain embodiments of the invention.

FIG. 11 shows another simplified flow chart showing a method 1100 for automatically stopping a recording, according to certain embodiments of the invention. In one embodiment, method 1100 is performed by aspects of systems 200 and 500 of FIGS. 2 and 5 including audio processor 208.

At step 1110, and referring to FIG. 6, processor 208 receives a harmonic analysis for the first set of segments and the second set of segments. At step 1120, harmonic content is identified for both sets and the silence and music scores are further amended based on the harmonic content (step 1130). In some embodiments, greater amounts of harmonic content found in the second set of segments would increase the music score accordingly. Although not shown in FIG. 11, harmonic content can be applied to determining an automatic stop condition, as would be appreciated by one of ordinary skill in the art with the benefit of this disclosure.

User Interface for Automatic Start/Stop Recording

Certain embodiments of the invention include a user-interface (UI) on a mobile display device that allows a user to automatically start a musical recording by simply playing an instrument (e.g., guitar, piano, horn, drum kit, etc.) without requiring manual interaction. A method for visually representing a recording session on a display is discussed herein. After launching the application, an icon is displayed, audio data is automatically received, and pulses that radiate outwardly, concentrically, and separately from the icon are generated in a rhythmic fashion that corresponds to audio events (e.g., transients) within the audio data. Certain visual features provide useful timing and historical information at a glance. Furthermore, certain visual indicators (e.g., recording symbols, background color, etc.) provide the user with a clear indication of whether a recording mode is active or inactive.

Figure 12:
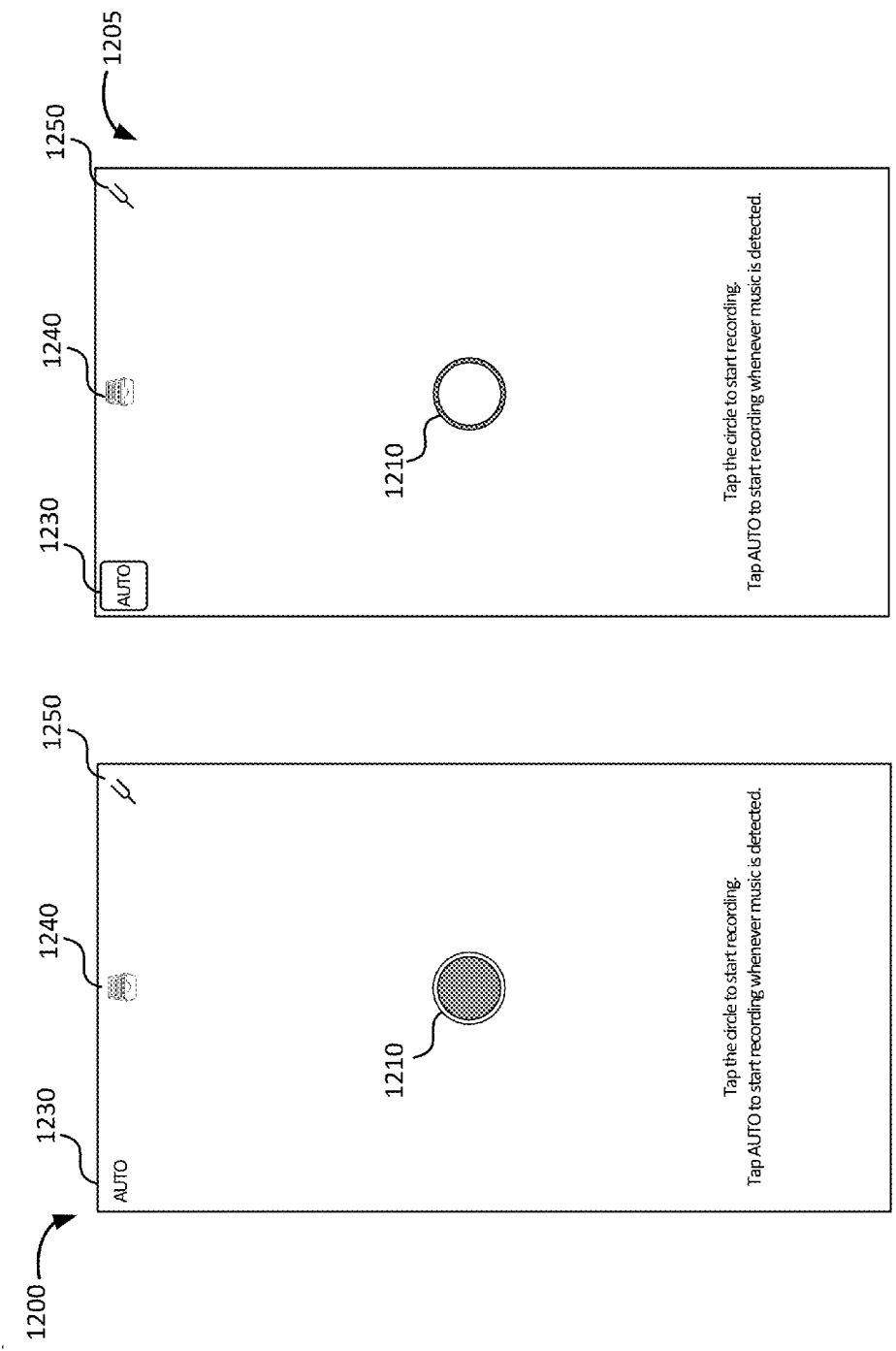
FIG. 12 shows a user-interface (UI) for an automatic recording session, according to certain embodiments of the invention.

FIG. 12 shows a user-interface (UI) 1200 for an automatic recording session, according to certain embodiments of the invention. When the application is launched, a UI 1200 is presented to the user. UI 1200 includes start/stop icon 1210, enable auto record button 1230, library navigation button 1240, and show tuner button 1250. Start/stop icon 1210 is shown as a circle located in the center of the display, however other shapes are possible (e.g., square, triangle, polygon, oval, amorphous, three-dimensional (e.g, spherical), etc.). In a manual mode of operation (discussed below), start/stop icon 1210 can be selected (e.g., manually pressed) to start and stop a recording. Enable auto record button 1230 toggles auto and manual recording modes. Auto recording mode can utilize the automatic recording functions described above with respect to FIGS. 2-11 to initiate automatic start/stop recording capabilities. Library navigation button 1240 provides access to music session logs recorded by the user (further discussed below). Pressing show tuner button 1250 causes a tuning application to be displayed. For instance, a guitar tuner may be displayed on UI 1200 to allow a user to tune their instrument. UI 1205 is identical to UI 1200, but shows enable auto record button ("auto record button") 1230 selected. In some embodiments, start/stop icon 1210 is represented as an empty circle (versus a filled circle), which can be used to quickly visually identify the manual/auto recording mode of operation at a glance.

Figure 13:
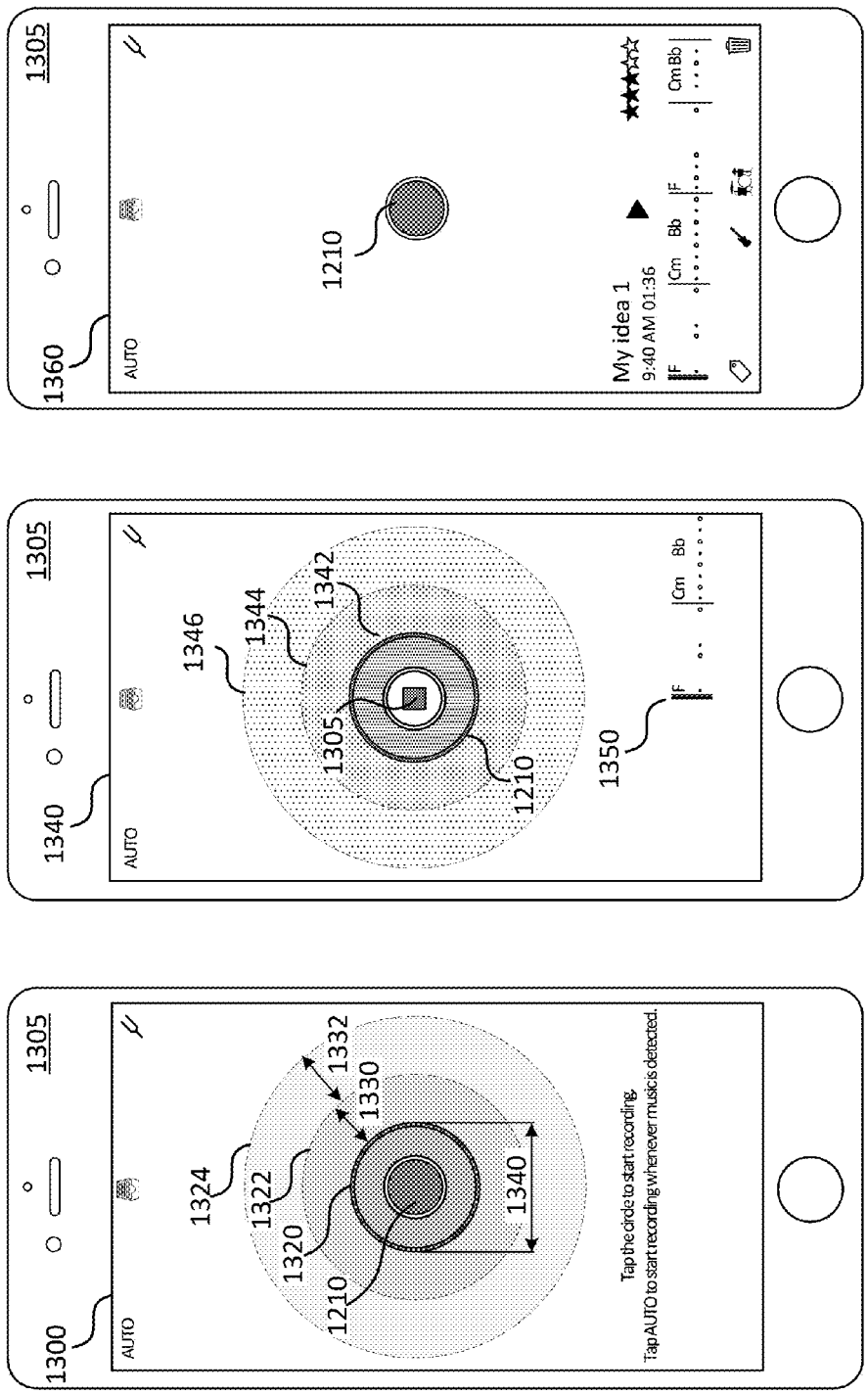
FIG. 13 shows a UI for automatic recording on a mobile device, according to certain embodiments of the invention.

FIG. 13 shows a UI 1300 for automatic recording on a mobile device 1305 (i.e., mobile phone), according to certain embodiments of the invention. Auto record button 1230 is not selected, thus the embodiments of FIG. 13 are shown in a manual mode of operation where the user physically selects the icon to start and stop a recording. UI 1300 visually displays a number of pulses radiating outwardly, concentrically, and separately from the icon. Each pulse may correspond to an audio event such as a kick drum, piano chord, or other musical event.

A timing between the pulses (1330, 1332) may correspond to a period of time between audio events within the audio data. A short history of pulses is captured in the UI as successive radiating pulses gradually fade as they move further away from start/stop icon 1210. This can be seen in pulses 1320, 1322, and 1324 of UI 1300.

A starting size of the pulses (e.g., size 1340 of pulse 1320) may correspond to an amplitude of the audio events within the audio data. Audio events having a relatively low amplitude may have a starting size very close (or at) the size of the start/stop icon 1210. Conversely, audio events having a relatively large amplitude may have starting sizes much larger than start/stop icon 1210 (e.g., pulse 1320). For example, a fast succession of low amplitude audio events would cause a relatively large number of pulses to be generated with starting sizes close to that of the icon and spacing between the pulses being relatively small. Conversely, sparsely Thus, the size and spacing between pulses as they radiate outward provides a visual history of the last several audio events.

UI 1300 is shown in a manual mode of operation, as indicated by solid start/stop icon 1210. Audio data is received and depicted as radiating pulses, but the audio data is not recorded until the user manually selects start/stop icon 1210. UI 1340 shows that start/stop icon 1210 has been selected and recording has begun. The UI should provide a clear visual indication that recording is either one or off. In some embodiments, an additional recording symbol 1304, shown as a small square configured within start/stop icon 1210, indicates that a recording is active. Background color cues can also provide an instantly recognizable recording status indicator to a user. In certain embodiments, a blue hue (UI 1300) indicates that recording is not active, and a red hue (UI 1340) indicates that recording is active. Other color schemes, visual cues, patterns, symbols, etc., to indicate a recording status are possible.

UI 1340 is shown in a recording state, as indicated by the background red hue and recording symbol 1305. Three 3 pulses 1342, 1344, 1346 radiate from icon 1210 and the audio data associated with the pulses are being recorded. The audio data is also analyzed to determine its harmonic content. In this example, the harmonic content includes an F major chord, C minor chord, and a Bb major chord. Harmonic analysis is further discussed above and in the corresponding co-pending application cross-cited above and titled "Music Analysis Platform."

UI 1360 shows a post-recording state where recording has ended and the performance is captured (stored) and accessible for playback. The performance can be named, played back, rated, deleted, paired with an automatic accompaniment, and more, as further discussed below.

Figure 14:
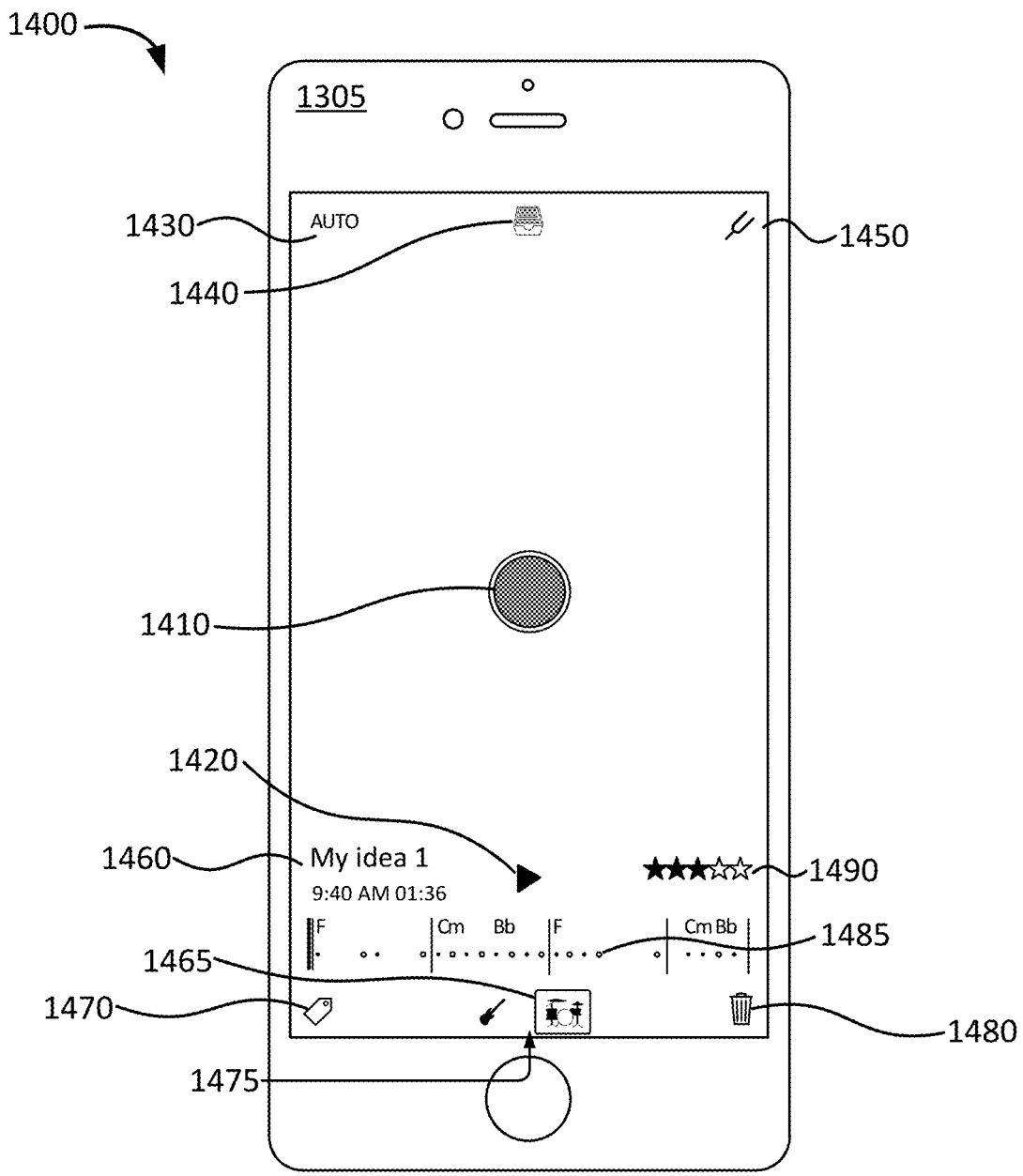
FIG. 14 shows a number of capture screen interactions on a recording user-interface, according to certain embodiments of the invention.

FIGS. 12-14 depict a UI in a manual capture mode of operation. In auto mode (set by depressing auto record button 1230), recording starts automatically as discussed above with respect to FIGS. 5-11. In an exemplary embodiments, a user launches the UI application and sets the mobile device done. A blue circular oscillating or pulsating icon is shown in a first color (e.g., blue) and is displayed in the center of the screen in response to the audio input (e.g., during a music session). The stronger the transients of the audio input the larger/brighter the pulsating icon. The brightness/largeness of the pulsating icon provides visual feedback to the user so they can determine whether they need to play louder or get closer or farther from the mobile device (e.g., phone microphone or accessory). When the music ends (i.e., a stop event is detected—see FIGS. 8-9) the circular icon morphs into a second color (e.g., red) square icon. In other words, the recording visualization provides visual feedback to the user that a music session has started and is in session (e.g., pulsating circular icon) or that the music session has ended (e.g., red square). Alternatively, a blue icon can indicate a music session has started and a red square may indicated recording has ended. In some embodiments, the auto mode UI visually performs the same as the manual capture mode but for the way the recording is started and stopped (manual operation versus automatic operation).

In certain embodiments, a user can start speaking to signify a musical intro cue, such as speaking "1 and a 2 and a 3 . . . ). The audio cue can be used to inform a start event with timing information (e.g., time signature for accompaniment authoring tool—see FIG. 14) and an intended start time for a musical performance. In further embodiments, a user can tap a rhythm on a table, on their chest, etc., which can be detected (as audio input) and used to detect the beginning of a musical performance, similar to the verbal cue discussed above. In some implementations, a user can start a recording session as they would in manual mode, but with a verbal cue rather than a physical button press. A user can say, for example, "hey Siri—start the recording . . . now!" These embodiments and similar implementations would be understood by one of ordinary skill in the art.

FIG. 14 shows a number of capture screen interactions on a recording user-interface 1400, according to certain embodiments of the invention. UI 1400 is launched on mobile device 1305. UI 1400 provides a number of tools to save, edit, and review saved recordings. UI 1400 includes start/stop icon 1410, enable auto record button 1430, library navigation button 1440, show tuner button 1450, play/pause button 1420 to play back or pause a previous recording. In some embodiments, play/pause button 1420 can be configured to loop a recording in response to a tap/hold touch gesture. Name button 1460 shows an editable name as well as recording time and duration statistics. Tag sheet 1470 can open a window that shows associated tags and allows a user to delete or create additional tags, which can be helpful when performing searches for specific recordings in a large library. Some features are not selectable as icons, but may be instantiated by certain touch gestures on the UI. For instance, an edge swipe 1475 on UI 1400 can open a secondary library navigation page. In some cases, there may be different library navigation pages (e.g., primary and secondary) having different editable parameters. Delete button 1480 allows a user to delete a recording. Rating 1490 shows a rating for the recording and may open a rating sheet to provide more editing capabilities. Song area 1485 shows a portion of the selected recording and may include harmonic information (e.g., chords, keys, etc.), rhythmic information (e.g., bars, time signature, tempo), or other relevant information. Song area 1485 can be zoomed in, zoomed out, swiped to visually display different sections of the recording, dragged to position a virtual playhead (starting point for playback), and tapped to reveal more details about the recording. Bass and drums on/off switch 1465 provides a suitable accompaniment for the recording based on its rhythmic and harmonic properties. The drum and/or bass accompaniment can be edited by pressing and holding on/off switch 1465. Automatic accompaniment is further discussed in U.S. Pat. No. 9,012,754, which is hereby incorporated by reference in its entirety for all purposes.

Figure 15:
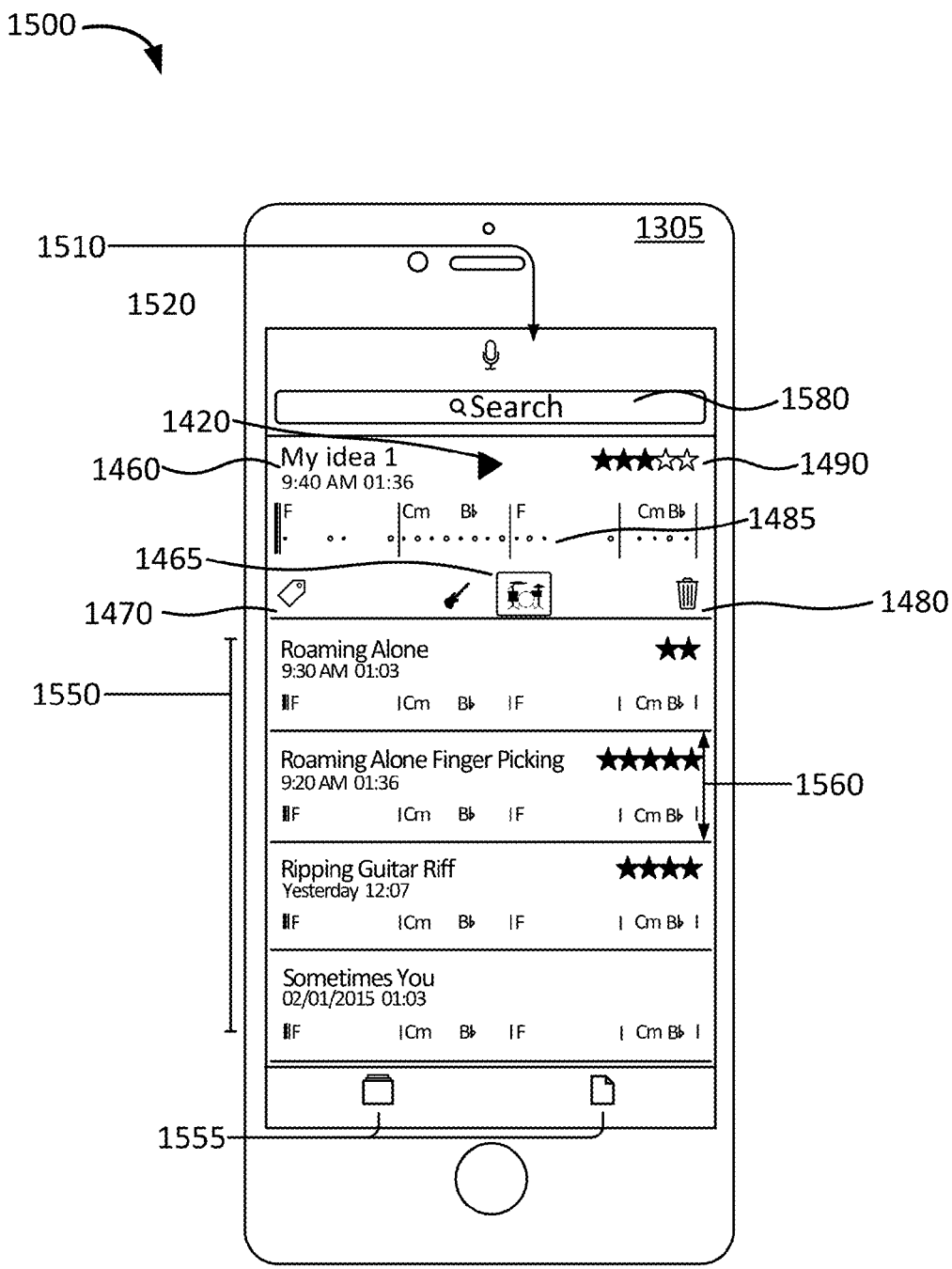
FIG. 15 shows a number of library functions in a recording user-interface (UI), according to certain embodiments of the invention.

FIG. 15 shows a number of library functions in a recording user-interface (UI) 1500, according to certain embodiments of the invention. The library functions may correspond to primary library functions associated with to library navigation button 1440, or secondary library functions associated with edge swipe 1475. Library functions can provide a method of maintaining (storing and managing) a log of all recorded sessions and may be shown in a minimalist dot notation with bars/measures and dots for a quick visual reference with a small footprint. In some cases, the size of the dots can correspond to the strength of the transient. Selecting a session in the list can cause a Log View to transition to a single session page view of a single session to provide more relative data.

A single session page view may show typical musical notation of the musical piece/session with a play head allowing the user to play the session back. A user can add notes to, tag, name the session, determine relevancy, provide implicit/explicit ratings (e.g., based on stars, play count, renaming, length, weighted coefficients for relevancy), etc. Tags can be associated with the piece, based on any criteria (e.g., genre, instrument, type of recording (rough vs. well developed), etc.), and new tags can be created (e.g., in response to a search yielding no match for the desired tag).

Referring back to FIG. 15, button 1520 can cause UI 1500 to switch to a primary capture navigation screen (e.g., UI 1200). An edge swipe at 1510 can cause UI 1500 to switch to a secondary capture navigation screen. UI 1500 further includes play/pause button 1420, name button 1460, tag sheet 1470, bass and drums on/off switch 1465, delete button 1480, song area 1485, and rating 1490, as described above. Recording library 1550 lists a number of unselected recordings. The recordings can be selected and may display certain recording parameters (e.g., name, run-time, harmonic/timing content, rating information, etc.). Swipe region 1560 allows a user to scroll through recording library 1550. Search bar 1580 allows a user to search for a name of a recording to find and select it for playback. Other parameters may be used with the search field to find certain recordings including run-time, harmonic content, rating, and more. Idea/Songs library button 1555 allows a user to switch the contents of recording library 1550 between ideas and songs. Ideas may be recordings that are not fully formed such as a single piano line, guitar riff, etc. Songs may include complete recordings with bass/drum accompaniment, for example.

Figure 16:
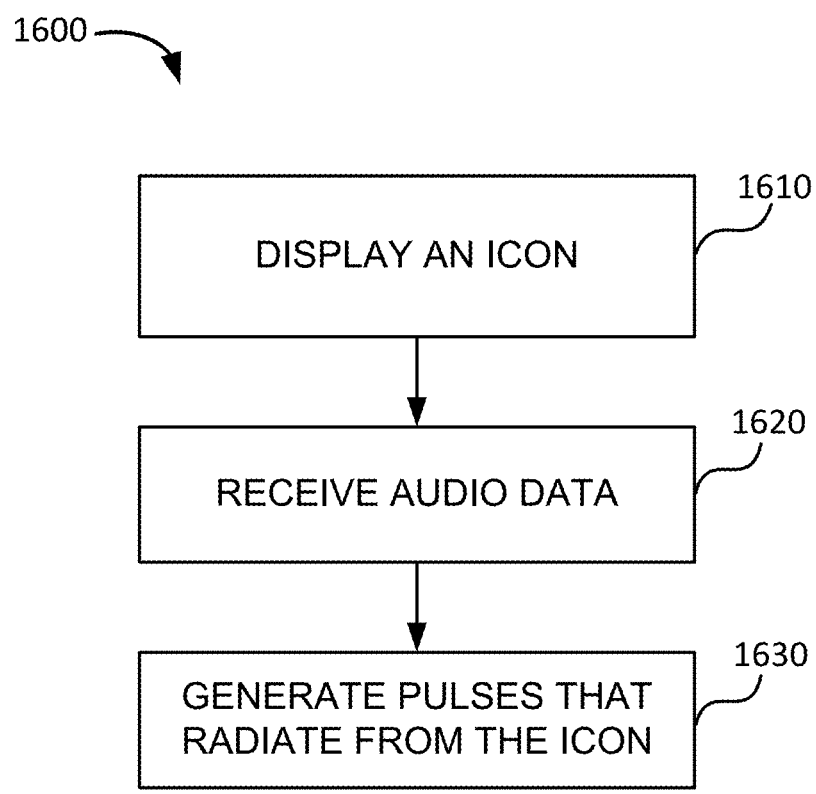
FIG. 16 shows a simplified flow chart showing a method for generating a user-interface for a recording device having visual feedback, according to certain embodiments of the invention.

FIG. 16 shows a simplified flow chart showing a method 1600 for generating a user-interface for a recording device having visual feedback, according to certain embodiments of the invention. In some embodiments, method 1600 is performed by aspects of systems 200 and 500 of FIGS. 2 and 5 including processing unit 208, and is displayed on a mobile device as shown in FIGS. 12-15.

At step 1610, an icon (e.g., start/stop icon 1210) is displayed on a user-interface configured for recording audio data. The icon can have any suitable shape including a circle, square, triangle, polygon, oval, amorphous, etc. In some embodiments, the icon may be three-dimensional and can be a sphere, cube, three-dimensional polygon, or any suitable shape.

At step 1620, audio data is received and UI begins generating pulses that radiate outwardly, concentrically, and separately from the icon (step 1630). In some embodiments, the radiation is uniform and the shape of the pulse remains substantially the same as it expands. In some embodiments, the pulse may change shape, oscillate, fade out, change color, or the like.

A timing of each successive pulse may correspond to audio events within the audio data, such as transients. That is, a pulse can be generated and coincident with an audio transient. For an audio input having musical content (harmony, rhythm, etc.), this can visually appear as if the pulses are occurring to the beat of the music. A spacing between consecutive pulses can correspond to a timing between audio events within the audio data. In the music example, a series of kick drums separated by 1 second may visually appear as a series of pulses generated at 1 second intervals. Thus, successive pulses with audio events that are very close in time may be close together as they radiate from the icon. Conversely, successive pulses with audio events that a far apart in time may appear as sparsely generated pulses radiating from the icon with longer spaces between them.

In some embodiments, a starting size of each pulse may correspond to an amplitude of the audio events within the audio data. Higher amplitude audio events may cause the starting size of the corresponding pulse to be larger than that of a pulse corresponding to a lower amplitude audio event. In some cases, a brightness of the pulse may be associated with the amplitude of the audio events.

In some embodiments, the icon is circular and centered on the UI. The radiating pulses are circular, concentric, and expand outwardly from the icon. In some implementations, the icon may be three-dimensional and the pulses may radiate in three dimensions from the icon. For instance, the icon may be spherical and spherical pulses may expand from the icon in a similar manner as described above.

Certain implementations may have multiple icons. For instance, a first icon may be associated with a left stereo channel and a second icon may be associated with a right stereo channel. Thus, audio content routed to the left stereo channel may include different audio events than the audio content routed to the right stereo channel, resulting in different pulse radiation patterns, timings, and intensities. Some embodiments may include multiple icons dedicated to particular frequencies. For instance, one icon may be dedicated to very low frequencies (e.g., 20-100 Hz) to capture bass drum performances and a second icon may be dedicated to middle frequencies (e.g., 1 kHz-2 kHz) to capture, e.g., a vocal performance and visually display pulses that correspond thereto.

It should be appreciated that the specific steps illustrated in FIG. 16 provide a particular method of automatically stopping a recording, according to certain embodiments of the present invention. Other sequences of steps may also be performed according to alternative embodiments. For instance, some embodiment may not need to display an icon as it may already be displayed. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 1600.

Figure 17:
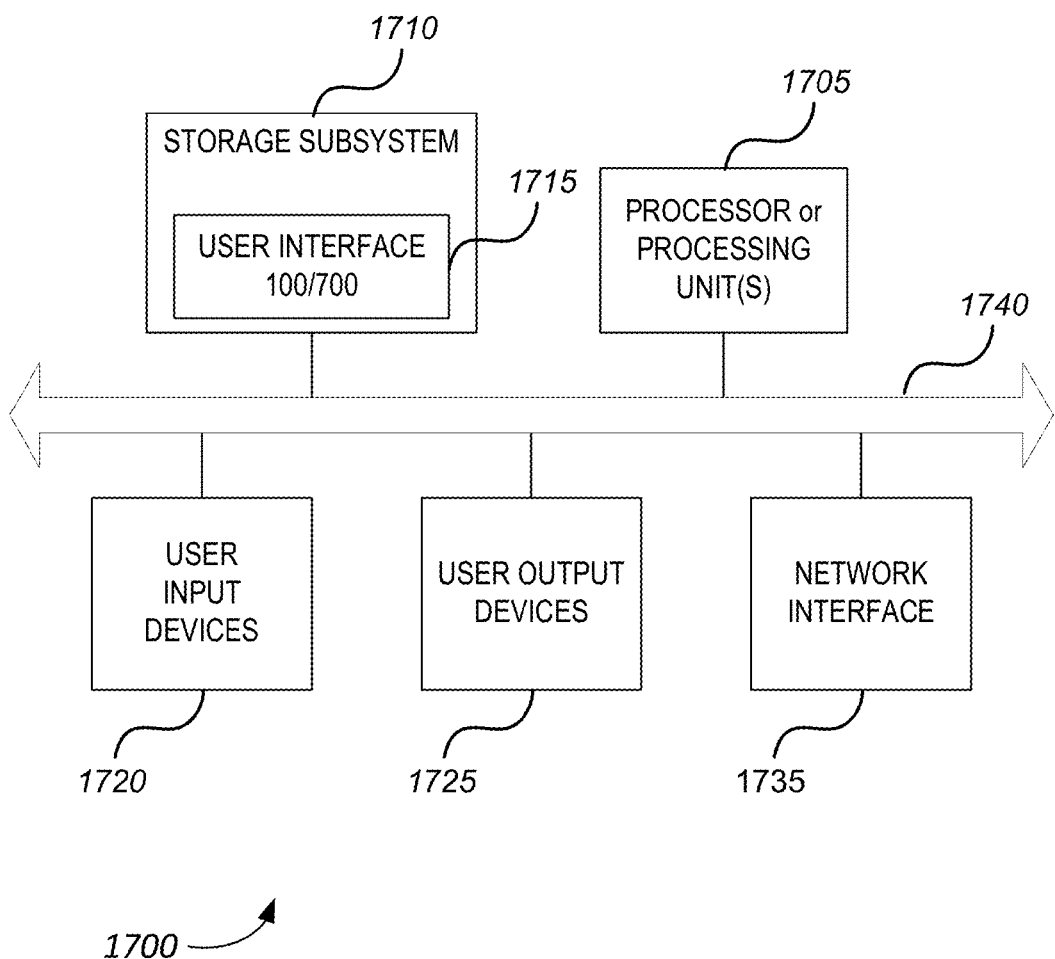
FIG. 17 is a simplified block diagram depicting a computer system that may incorporate components of various systems and devices described, according to certain embodiments of the invention.

FIG. 17 is a simplified block diagram depicting a computer system 1700 that may incorporate components of various systems and devices described, according to certain embodiments of the invention. In some cases, a computing device can incorporate some or all of the components of computer system 1700. Computer system 1700 may include one or more processors 1702 that communicate with a number of peripheral subsystems via a bus subsystem 1704. These peripheral subsystems may include a storage subsystem 1706, including a memory subsystem 1708 and a file storage subsystem 1710, user interface input devices 1712, user interface output devices 1714, and a network interface subsystem 1716.

Bus subsystem 1704 can provide a mechanism for allowing the various components and subsystems of computer system 1700 communicate with each other as intended. Although bus subsystem 1704 is shown schematically as a single bus, in some cases, the bus subsystem may utilize multiple busses.

Processor 1702, which can be implemented as one or more integrated circuits (e.g., a conventional microprocessor or microcontroller), controls the operation of computer system 1700. One or more processors 1702 may be provided. These processors may include single core or multicore processors. In some cases, processor 1702 can execute a variety of programs in response to program code and can maintain multiple concurrently executing programs or processes. At any given time, some or all of the program code to be executed can be resident in processor(s) 1702 and/or in storage subsystem 1706. Through suitable programming, processor(s) 1702 can provide various functionalities described above.

Network interface subsystem 1716 provides an interface to other computer systems and networks. Network interface subsystem 1716 serves as an interface for receiving data from and transmitting data to other systems from computer system 1700. For example, network interface subsystem 1716 may enable computer system 1700 to connect to one or more devices via the Internet. In some cases, network interface 1716 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some cases, network interface 1716 can provide wired network connectivity (e.g., Ethernet) in addition to or instead of a wireless interface.

User interface input devices 1712 may include a keyboard, pointing devices such as a mouse or trackball, a touchpad or touch screen incorporated into a display, a scroll wheel, a click wheel, a dial, a button, a switch, a keypad, audio input devices such as voice recognition systems, microphones, eye gaze systems, and other types of input devices. In general, use of the term "input device" is intended to include all possible types of devices and mechanisms for inputting information to computer system 1700. For example, in an iPhone®, user input devices 1712 may include one or more buttons provided by the iPhone® and a touchscreen which may display a software keyboard, and the like.

User interface output devices 1714 may include a display subsystem, indicator lights, or non-visual displays such as audio output devices, etc. The display subsystem may be a cathode ray tube (CRT), a flat-panel device such as a liquid crystal display (LCD), a projection device, a touch screen, and the like. In general, use of the term "output device" is intended to include all possible types of devices and mechanisms for outputting information from computer system 1700. For example, a software keyboard may be displayed using a flat-panel screen.

Storage subsystem 1706 provides a computer-readable storage medium for storing the basic programming and data constructs that provide the functionality of various aspects disclosed herein. Storage subsystem 1706 can be implemented, e.g., using disk, flash memory, or any other storage media in any combination, and can include volatile and/or non-volatile storage as desired. Software (programs, code modules, instructions) that when executed by a processor provide the functionality described above may be stored in storage subsystem 1706. These software modules or instructions may be executed by processor(s) 1702. Storage subsystem 1706 may also provide a repository for storing data used in accordance with the present invention. Storage subsystem 1706 may include memory subsystem 1708 and file/disk storage subsystem 1710.

Memory subsystem 1708 may include a number of memories including a main random access memory (RAM) 1718 for storage of instructions and data during program execution and a read only memory (ROM) 1720 in which fixed instructions are stored. File storage subsystem 1710 may provide persistent (non-volatile) memory storage for program and data files, and may include a hard disk drive, a floppy disk drive along with associated removable media, a Compact Disk Read Only Memory (CD-ROM) drive, an optical drive, removable media cartridges, and other like memory storage media.

Computer system 1700 can be of various types including a personal computer, a portable device (e.g., an iPhone®, an iPad®, and the like), a workstation, a network computer, a mainframe, a kiosk, a server or any other data processing system. Due to the ever-changing nature of computers and networks, the description of computer system 1700 depicted in FIG. 17 is intended only as a specific example. Many other configurations having more or fewer components than the system depicted in FIG. 17 are possible.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A computer-implemented method comprising:
receiving audio data by a processor;
dividing, by the processor, the audio data into a first set of consecutive segments and a second set of consecutive segments, the second set of segments occurring after the first set of segments;
analyzing, by the processor, the first set of segments by:
measuring and comparing an average energy between two or more of the first set of segments; and
determining a silence score based on the comparison of the average energies for the two or more of the first set of segments;
analyzing, by the processor, the second set of segments by:
measuring and comparing an average energy between two or more of the second set of segments; and
determining an audio score based on the comparison of the average energies for the two or more of the second set of segments; and
beginning a recording of the audio data when:
the silence score is above a first predetermined value; and
the audio score is above a second predetermined value.

2. The method of claim 1 wherein analyzing the first set of segments further includes measuring and comparing a maximum amplitude for two or more of the first set of segments,
wherein analyzing the second set of segments further includes measuring and comparing a maximum amplitude for two or more of the first set of segments,
wherein determining the silence score is further based on the comparison of the maximum amplitudes for the two or more of the first set of segments, and
wherein determining the audio score is further based on the comparison of the maximum amplitudes for the two or more of the second set of segments.

3. The method of claim 1 wherein analyzing the first set of segments further comprises:
comparing the average energy for the two or more of the first set of segments to a first threshold value; and
increasing the silence score in response to consecutive segments of the first set of segments being higher than the first threshold value.

4. The method of claim 1 wherein analyzing the second set of segments further comprises:
comparing the average energy for the two or more of the second set of segments to a second threshold value; and
increasing the audio score in response to consecutive segments of the second set of segments being higher than the second threshold value.

5. The method of claim 1 wherein the audio score is further based, in part, on a relative difference between average energy of the two or more of the second set of segments as compared to average energy of the two or more of the first set of segments.

6. The method of claim 1 further comprising:
receiving additional audio data by the processor, the additional audio data being a continuation of the audio data and received after the audio data;
dividing, by the processor, the additional audio data into a third set of consecutive segments;
analyzing, by the processor, the third set of segments by:
measuring and comparing an average energy for two or more of the third plurality of segments; and
determining a silence score based on the comparison of the maximum and average energies for the two or more of the third set of segments; and
stopping the recording of the audio when the silence score is above the first predetermined value.

7. The method of claim 1 wherein the first set of segments includes 5 segments, wherein the second set of segments includes 5 segments, and wherein each segment in the first and second set of segments is 0.5 seconds in length.

8. The method of claim 1 wherein analyzing the first set of segments further includes receiving a harmonic analysis for the two or more of the first set of segments, the harmonic analysis corresponding to identified harmonic content within the two or more of the first set of segments,
wherein analyzing the second set of segments further includes receiving a harmonic analysis for the two or more of the second set of segments, the harmonic analysis corresponding to identified harmonic content within the two or more of the second set of segments,
wherein determining the silence score is further based on harmonic analysis for the two or more of the first set of segments, and wherein determining an audio score is further based on the harmonic analysis for the two or more of the second set of segments.

9. The method of claim 1 further comprising:
storing the audio recording in an output file, the audio recording starting at the beginning of the first set of consecutive segments.

10. A computer-implemented system comprising:
one or more processors; and
one or more non-transitory computer-readable storage mediums containing instructions configured to cause the one or more processors to perform operations including:
receiving audio data;
dividing the audio data into a first set of consecutive segments and a second set of consecutive segments, the second set of segments occurring after the first plurality of segments;
analyzing the first set of segments by:
measuring and comparing an average energy between two or more of the first set of segments; and
determining a silence score based on the comparison of the average energies for the two or more of the first set of segments;
analyzing the second set of segments by:
measuring and comparing an average energy between two or more of the second set of segments; and determining an audio score based on the comparison of the average energies for the two or more of the second set of segments; and beginning a recording of the audio data when:
the silence score is above a first predetermined value; and
the audio score is above a second predetermined value.

11. The computer-implemented system of claim 10 wherein analyzing the first set of segments further includes measuring and comparing a maximum amplitude for two or more of the first set of segments,
wherein analyzing the second set of segments further includes measuring and comparing a maximum amplitude for two or more of the first set of segments,
wherein determining the silence score is further based on comparison of the maximum amplitudes for the two or more of the first set of segments, and
wherein determining the audio score is further based on the comparison of the maximum amplitudes for the two or more of the second set of segments.

12. The computer-implemented system of claim 10 wherein analyzing the first set of segments further comprises:
comparing the average energy for the two or more of the first set of segments to a first threshold value; and
increasing the silence score in response to consecutive segments of the first set of segments being higher than the first threshold value, and
wherein analyzing the second set of segments further comprises:
comparing the average energies for the two or more of the second set of segments to a second threshold value; and
increasing the audio score in response to consecutive segments of the second set of segments being higher than the second threshold value.

13. The computer-implemented system of claim 10 further comprising:
receiving additional audio data by the processor, the additional audio data being a continuation of the audio data and received after the audio data;
dividing the additional audio data into a third set of consecutive segments;
analyzing the third set of segments by:
measuring and comparing an average energy for the two or more of the third plurality of segments; and
determining a silence score based on the comparison of the average energies for the two or more of the third set of segments; and
stopping the recording of the audio when the silence score is above the first predetermined value.

14. The computer-implemented system of claim 10 wherein analyzing the first set of segments further includes receiving a harmonic analysis for the two or more of the first set of segments, the harmonic analysis corresponding to identified harmonic content within the two or more of the first set of segments,
wherein analyzing the second set of segments further includes receiving a harmonic analysis for the two or more of the second set of segments, the harmonic analysis corresponding to identified harmonic content within the two or more of the second set of segments,
wherein determining the silence score is further based on harmonic analysis for the two or more of the first set of segments, and wherein determining an audio score is further based on the harmonic analysis for the two or more of the second set of segments.

15. A non-transitory computer-program product tangibly embodied in a machine-readable non-transitory storage medium, including instructions configured to cause a data processing apparatus to:
receive audio data;
divide the audio data into a first set of consecutive segments and a second set of consecutive segments, the second set of segments occurring after the first plurality of segments;
analyze the first set of segments by:
measuring and comparing an average energy between two or more of the first set of segments; and
determining a silence score based on the comparison of the average energies for the two or more of the first set of segments;
analyze the second set of segments by:
measuring and comparing an average energy between two or more of the second set of segments; and
determining an audio score based on the comparison of the average energies for the one or more of the second set of segments; and
begin a recording of the audio data when:
the silence score is above a first predetermined value; and
the audio score is above a second predetermined value.

16. The computer-program product of claim 15 wherein analyzing the first set of segments further includes measuring and comparing a maximum amplitude for two or more of the first set of segments,
wherein analyzing the second set of segments further includes measuring and comparing a maximum amplitude for two or more of the first set of segments,
wherein determining the silence score is further based on the maximum amplitudes for the two or more of the first set of segments, and
wherein determining the audio score is further based on the maximum amplitudes for the two or more of the second set of segments.

17. The computer-program product of claim 15 wherein analyzing the first set of segments further comprises:
comparing the average energy for the two or more of the first set of segments to a first threshold value; and
increasing the silence score in response to consecutive segments of the first set of segments being higher than the first threshold value.

18. The computer-program product of claim 15 wherein analyzing the second set of segments further comprises:
comparing the average energy for the two or more of the second set of segments to a second threshold value; and
increasing the audio score in response to consecutive segments of the second set of segments being higher than the second threshold value.

19. The computer-program product of claim 15 further including instructions configured to cause a data processing apparatus to:
receive additional audio data by the processor, the additional audio data being a continuation of the audio data and received after the audio data;
divide, by the processor, the additional audio data into a third set of consecutive segments;
analyze, by the processor, the third set of segments by:
measuring and comparing an average energy for two or more of the third plurality of segments; and
determining a silence score based on the comparison of the average energies for the two or more of the third set of segments; and
stop the recording of the audio when the silence score is above the first predetermined value.

20. The computer-program product of claim 15 wherein analyzing the first set of segments further includes receiving a harmonic analysis for the two or more of the first set of segments, the harmonic analysis corresponding to identified harmonic content within the two or more of the first set of segments,
   wherein analyzing the second set of segments further includes receiving a harmonic analysis for the two or more of the second set of segments, the harmonic analysis corresponding to identified harmonic content within the two or more of the second set of segments,
   wherein determining the silence score is further based on harmonic analysis for the two or more of the first set of segments, and wherein determining an audio score is further based on the harmonic analysis for the two or more of the second set of segments.

* * * * *